(12) United States Patent
Takayama

(10) Patent No.: US 8,996,357 B2
(45) Date of Patent: Mar. 31, 2015

(54) METHOD FOR GENERATING DIAGRAMS, AND INFORMATION PROCESSING APPARATUS FOR SAME

(75) Inventor: Kuniharu Takayama, Tama (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 13/525,400

(22) Filed: Jun. 18, 2012

(65) Prior Publication Data

US 2013/0013287 A1     Jan. 10, 2013

(30) Foreign Application Priority Data

Jul. 6, 2011     (JP) ................................ 2011-149711

(51) Int. Cl.
*G06F 17/28*     (2006.01)
*G06F 9/44*      (2006.01)

(52) U.S. Cl.
CPC ....................................... *G06F 8/34* (2013.01)
USPC ................ 704/4; 704/6; 704/7; 704/8; 704/9; 704/10

(58) Field of Classification Search
USPC ........................................................ 704/4–10
See application file for complete search history.

(56) References Cited

U.S. PATENT DOCUMENTS

| | | | | |
|---|---|---|---|---|
| 6,651,039 | B1 * | 11/2003 | Ikuta et al. | 704/4 |
| 2005/0267761 | A1 * | 12/2005 | Ueno | 704/277 |
| 2010/0325491 | A1 | 12/2010 | Kumanan et al. | |

FOREIGN PATENT DOCUMENTS

| | | |
|---|---|---|
| JP | 07-28630 A | 1/1995 |
| JP | 10-136260 A | 5/1998 |
| JP | 2000-353082 A | 12/2000 |
| JP | 2008-305079 A | 12/2008 |

OTHER PUBLICATIONS

Japanese Office Action issued on Dec. 16, 2014 for corresponding Japanese Patent Application No. 2011-149711, with Partial English Translation, 5 pages.

(Continued)

*Primary Examiner* — Leonard Saint Cyr
(74) *Attorney, Agent, or Firm* — Fujitsu Patent Center

(57) ABSTRACT

A computer analyzes a statement written in a natural language to determine the types and structure of phrases that constitute the statement. A memory stores a plurality of translation rules for different types of phrases, each rule describing how a phrase is to be translated into graphical symbol datasets and relationship link datasets. Each graphical symbol dataset specifies a graphical symbol having a content label representing its content. The content label is or includes a word contained in the pertinent phrase. Each relationship link dataset specifies a relationship link that represents a relationship between graphical symbols and has a particular end shape to indicate what type of relationship it is. The computer translates each phrase of the statement into two or more graphical symbol datasets and one or more relationship link datasets, according to the translation rules pertinent to the determined phrase types.

11 Claims, 21 Drawing Sheets

(56) References Cited

OTHER PUBLICATIONS

Okumura, Kazue et al., "A proposal for articulated Japanese usecase description and some experiments on creating class diagrams", The Special Interest Group Technical Report, Information Processing Society of Japan, Nov. 5, 2009, vol. 2009-SE-166 No. 1, pp. 1-8, with Partial English Abstract, see JPOA issued Dec. 16, 2014.

Harada, Minoru et al., "An Automatic Generation of Object Modeling Diagrams from Japanese Requirement Statements", Journal of Information Processing Society of Japan, Japan, Information Processing Society of Japan, Oct. 15, 1997, vol. 38 No. 10, pp. 2031-2039, with Partial English Abstract.

* cited by examiner

FIG. 7

TRANSLATION RULE DATABASE (120)

| Rule # | 1 | | |
|---|---|---|---|
| Phrase Type # | 1 | | |
| Word # | 11:(*)→$1 | 12:NO | 13:(*)→$2 |
| Element Type # | 11:(object:$1) | 12:(aggregation:◇—) | 13:(attribute:$2) |

(121)

| Rule # | 2 | | | |
|---|---|---|---|---|
| Phrase Type # | 2 | | | |
| Word # | 21:(*)→$1 | 22:WO | 23:(*)SURU→$2 | |
| Element Type # | 21:(object:$1) | | 23:(activity:$2) | 24:(aggregation:◇—) 25:(reference:—→) 26:(attribute:$2 status) |
| | | | | 26:(attribute:$2 status) |

(122, 123)

| Rule # | 3 | | |
|---|---|---|---|
| Phrase Type # | 3 | | |
| Word # | 31:(*)→$1 | 32:TSUGINI | 33:(*)→$2 |
| Element Type # | 31:(activity:$1) | 32:(activity edge) | 33:(activity:$2) |

| Rule # | 4 | | |
|---|---|---|---|
| Phrase Type # | 4 | | |
| Word # | 41:(*)→$1 | 42:SAINI | 43:(*)→$2 |
| Element Type # | 41:(activity:$1) | 42:(sub-activity) | 43:(activity:$2) |

(1) KOUJI NO NICHIJI
(2) KOUJI NO BASHO
(3) KOUJI NO TANTOUSHA
(4) TANTOUSHA NO SHIMEI
(5) KOUJI WO JUCHUU SURU
(6) KOUJI WO TEHAI SURU
(7) TANTOUSHA WO WARIATE SURU
(8) JUCHUU SHITA TSUGINI TEHAI SURU
(9) TEHAI SURU SAINI WARIATE SURU (1) 工事の日時
(2) 工事の場所
(3) 工事の担当者
(4) 担当者の氏名
(5) 工事を受注する
(6) 工事を手配する
(7) 担当者を割当する
(8) 受注した次に手配する
(9) 手配する際に割当する

(1) Noun: *KOUJI*, Particle: *NO*, Noun: *NICHIJI*
(2) Noun: *KOUJI*, Particle: *NO*, Noun: *BASHO*
(3) Noun: *KOUJI*, Particle: *NO*, Noun: *TANTOUSHA*
(4) Noun: *TANTOUSHA*, Particle: *NO*, Noun: *SHIMEI*
(5) Noun: *KOUJI*, Particle: *WO*, Verb: *JUCHUU SURU*
(6) Noun: *KOUJI*, Particle: *WO*, Verb: *TEHAI SURU*
(7) Noun: *TANTOUSHA*, Particle: *WO*, Verb: *WARIATE SURU*
(8) Verb: *JUCHUU SHITA*, Adverb: *TSUGINI*, Verb: *TEHAI SURU*
(9) Verb: *TEHAI SURU*, Adverb: *SAINI*, Verb: *WARIATE SURU*

(1) Noun:工事, Particle:の, Noun:日時
(2) Noun:工事, Particle:の, Noun:場所
(3) Noun:工事, Particle:の, Noun:担当者
(4) Noun:担当者, Particle:の, Noun:氏名
(5) Noun:工事, Particle:を, Verb:受注する
(6) Noun:工事, Particle:を, Verb:手配する
(7) Noun:担当者, Particle:を, Verb:割当する
(8) Verb:受注した, Adverb:次に, Verb:手配する
(9) Verb:手配する, Adverb:際に, Verb:割当する

(1) Phrase Type #1: Noun: *KOUJI*, Particle: *NO*, Noun: *NICHIJI*
(2) Phrase Type #1: Noun: *KOUJI*, Particle: *NO*, Noun: *BASHO*
(3) Phrase Type #1: Noun: *KOUJI*, Particle: *NO*, Noun: *TANTOUSHA*
(4) Phrase Type #1: Noun: *TANTOUSHA*, Particle: *NO*, Noun: *SHIMEI*
(5) Phrase Type #2: Noun: *KOUJI*, Particle: *WO*, Verb: *JUCHUU SURU*
(6) Phrase Type #2: Noun: *KOUJI*, Particle: *WO*, Verb: *TEHAI SURU*
(7) Phrase Type #2: Noun: *TANTOUSHA*, Particle: *WO*, Verb: *WARIATE SURU*
(8) Phrase Type #3: Verb: *JUCHUU SHITA*, Adverb: *TSUGINI*, Verb: *TEHAI SURU*
(9) Phrase Type #4: Verb: *TEHAI SURU*, Adverb: *SAINI*, Verb: *WARIATE SURU*

(1) Phrase Type #1: Noun: 工事, Particle: の, Noun: 日時
(2) Phrase Type #1: Noun: 工事, Particle: の, Noun: 場所
(3) Phrase Type #1: Noun: 工事, Particle: の, Noun: 担当者
(4) Phrase Type #1: Noun: 担当者, Particle: の, Noun: 氏名
(5) Phrase Type #2: Noun: 工事, Particle: を, Verb: 受注する
(6) Phrase Type #2: Noun: 工事, Particle: を, Verb: 手配する
(7) Phrase Type #2: Noun: 担当者, Particle: を, Verb: 割当する
(8) Phrase Type #3: Verb: 受注した, Adverb: 次に, Verb: 手配する
(9) Phrase Type #4: Verb: 手配する, Adverb: 際に, Verb: 割当する

METHOD FOR GENERATING DIAGRAMS, AND INFORMATION PROCESSING APPARATUS FOR SAME

CROSS-REFERENCE TO RELATED APPLICATION

This application is based upon and claims the benefit of priority of the prior Japanese Patent Application No. 2011-149711, filed on Jul. 6, 2011, the entire contents of which are incorporated herein by reference.

FIELD

The embodiments discussed herein are related to a method for generating diagrams and an information processing apparatus for the same.

BACKGROUND

The development process of a business application or other data processing system begins with determining specifications of that system. The determined specifications are described by using, for example, the Unified Modeling Language (UML) diagrams and formal languages.

Before starting to write specifications with UML or a formal language, the development team has to define what the system is supposed to do. This phase needs the knowledge of actual business activities. Expertise in UML modeling and formal languages is then used to describe specific system requirements as determined by the preceding phase. UML offers various forms of graphical representation for system modeling, such as class diagrams and activity diagrams. These standardized diagrams help third-party persons to understand the system specifications.

Typically, business practitioners have a thorough knowledge of their work, but they are not experts in the field of UML and formal languages. System engineers, on the other hand, know all about UML and formal languages, but may lack knowledge of actual business activities. Accordingly, business practitioners and system engineers have to work together to write UML scripts and other documents, although this approach may be slow and inefficient.

To overcome the above inefficiency issues, there is proposed a technique of converting, for example, natural-language sentences into a formal-language script so that a computer can translate it into executable programs. See, for example, Japanese Laid-open Patent Publication No. 7-28630 (1995).

Formal-language scripts are suitable for automated parsing by a computer. But, unlike graphical models, they are not easy to understand for average people. To build an easy-to-understand system model, business practitioners and system engineers still have to work together, while putting the efficiency issues aside, to combine their knowledge and expertise about business activities and modeling languages such as UML.

SUMMARY

According to an aspect of the invention, there is provided a computer-readable medium encoded with a program. This program causes a computer to perform a procedure including: storing a plurality of translation rules for different types of phrases, each translation rule describing how a phrase is to be translated into graphical symbol datasets and relationship link datasets, the graphical symbol datasets each specifying a graphical symbol with a content label representing content of the graphical symbol, the content label being or including a word contained in the phrase, the relationship link datasets each specifying a relationship link that represents a relationship between graphical symbols, the relationship link having a particular end shape to indicate a type of relationships; analyzing a statement written in a natural language to determine types and structure of phrases that constitute the statement; and translating each of the phrases constituting the statement into two or more graphical symbol datasets and one or more relationship link datasets, according to the translation rules pertinent to the determined types of the phrases.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary data structure of a translation rule database;

FIG. 12 illustrates an example of natural-language statements which are used to explain how the proposed system operates;

FIG. 13 illustrates an exemplary analysis result obtained by a linguistic processing unit;

FIG. 14 illustrates an exemplary result of phrase type determination;

DESCRIPTION OF EMBODIMENTS

Figure 1:
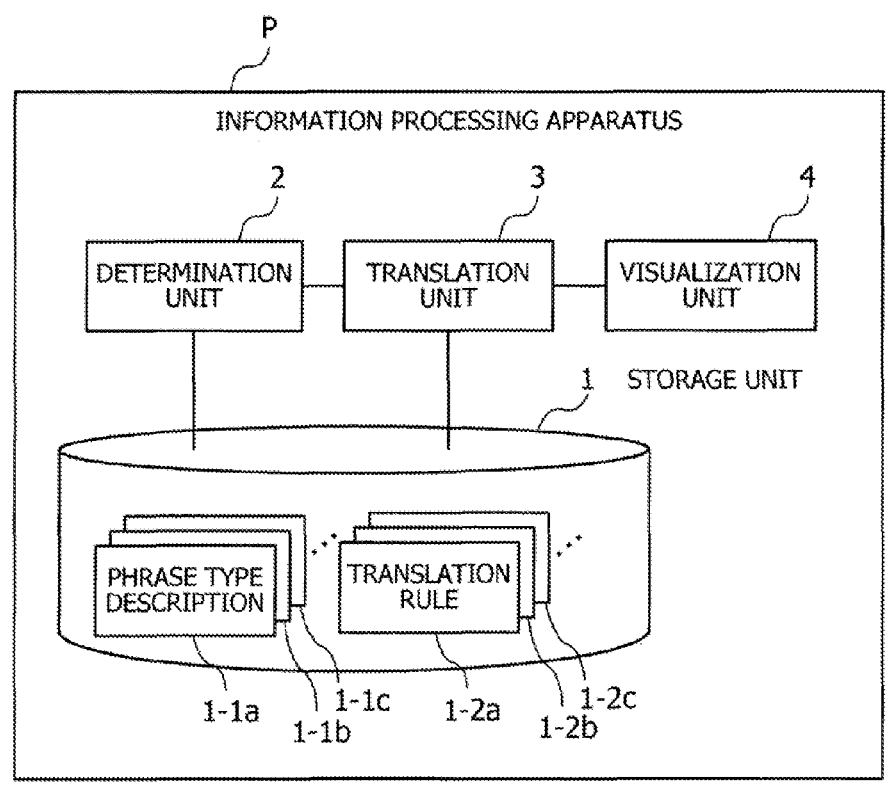
FIG. 1 illustrates an exemplary functional structure of an information processing apparatus according to a first embodiment.

Several embodiments of the present invention will be described below with reference to the accompanying drawings, wherein like reference numerals refer to like elements throughout. Each of those embodiments may be combined with other embodiments as long as there are no contradictions between them.

(a) First Embodiment

FIG. 1 illustrates an exemplary functional structure of an information processing apparatus according to a first embodiment. The illustrated information processing apparatus P includes a storage unit 1, a determination unit 2, a translation unit 3, and a visualization unit 4.

The storage unit 1 stores, for example, a plurality of phrase type descriptions 1-1a, 1-1b, 1-1c, and so on, and a plurality of translation rules 1-2a, 1-2b, 1-2c, and so on. The phrase type descriptions 1-1a, 1-1b, 1-1c, ... describe different types of phrases.

Specifically, each phrase type description 1-1a, 1-1b, 1-1c, ... provides a set of conditions that are tested to determine whether a given phrase matches with a specific phrase type. These conditions may define a phrase type as an array of words in particular lexical categories or particular characters or their combinations.

Translation rules 1-2a, 1-2b, 1-2c, ... are provided for each different type of phrases. That is, the translation rule of a specific phrase type defines how a pertinent phrase can be translated into graphical symbol datasets and relationship link datasets. A graphical symbol dataset specifies a graphical symbol with a specific content label representing the content of the symbol. The content label is or includes a word contained in the given phrase. A relationship link dataset specifies a line to be drawn between graphical symbols to represent their relationship, the line having a particular end shape to indicate what type of relationship it is. This line is referred to herein as a relationship link.

The determination unit 2 analyzes a given statement written in a natural language to determine the types and structure of phrases constituting the statement. For example, the determination unit 2 performs a morphological analysis on a phrase in the statement to determine the lexical category of each word (morpheme) constituting the phrase. The determination unit 2 then searches the storage unit 1 to find one of the stored phrase type descriptions 1-1a, 1-1b, 1-1c, . . . that matches with the structure of the phrase. When such a phrase type description is found, the determination unit 2 determines that the phrase falls into a particular phrase type indicated by that description.

The translation unit 3 translates each phrase constituting the statement into two or more graphical symbol datasets and on or more relationship link datasets, with reference to translation rules in the storage unit 1 which are pertinent to their respective phrase types. For example, the translation unit 3 selects a translation rule pertinent to the type of a given phrase in the statement, from among those stored in the storage unit 1. Based on the selected translation rule, the translation unit 3 translates the phrase into two or more graphical symbol datasets and one or more relationship link datasets representing relationship links connecting graphical symbols.

The visualization unit 4 displays a diagram based on the plurality of graphical symbol datasets and relationship link datasets produced by the above translation. The resulting diagram includes a plurality of graphical symbols with a content label indicating their respective subject matter. The displayed graphical symbols may be interconnected by relationship links whose end shapes represent specific relationships.

The above determination unit 2, translation unit 3, and visualization unit 4 of FIG. 1 may be implemented by using, for example, a central processing unit (CPU) in the information processing apparatus P. The storage unit 1 may be implemented by using, for example, a random access memory (RAM) or a hard disk drive (HDD) in the information processing apparatus P.

It is noted that the lines interconnecting the functional blocks in FIG. 1 are only an example. FIG. 1 actually omits some communication paths for simplicity purposes. The person skilled in the art would appreciate that there may be other communication paths in actual implementations.

In operation, the above-described information processing apparatus P receives, for example, a set of sentences that describe the specification of a computer system in a natural language. A diagram generation process is then invoked in the information processing apparatus with the received sentences.

Figure 2:
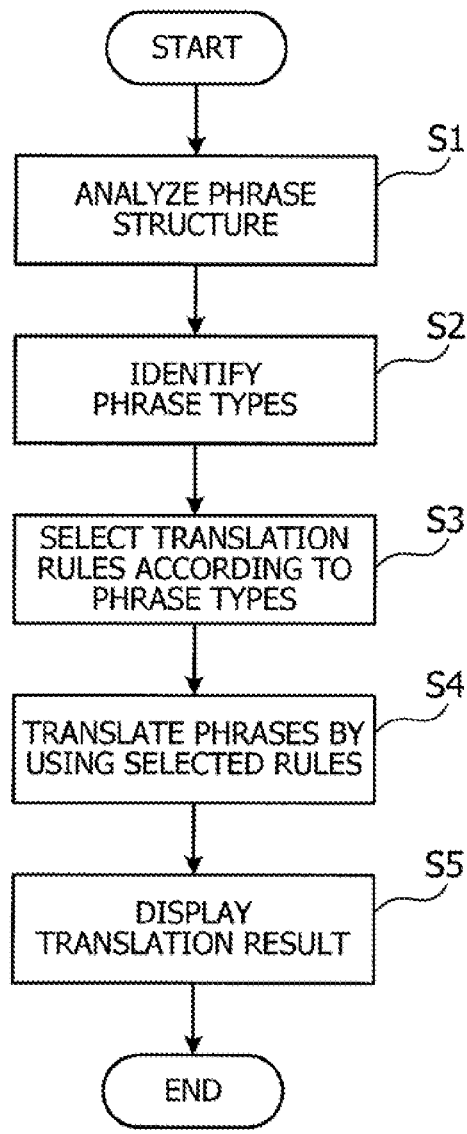
FIG. 2 is a flowchart illustrating an example of a diagram generation procedure according to the first embodiment.

FIG. 2 is a flowchart illustrating an example of a diagram generation procedure according to the first embodiment. Each step of FIG. 2 will be described below in the order of step numbers.

(Step S1) The determination unit 2 analyzes the structure of phrases constituting a given natural-language statement. For example, the determination unit 2 performs a morphological analysis on each phrase.

(Step S2) The determination unit 2 determines the type of each phrase. For example, the determination unit 2 finds a phrase type description that matches with a phrase, based on how its constituent words are arranged in the phrase in question. Based on the phrase type descriptions, the determination unit 2 determines in what phrase type each phrase of the given statement is categorized.

(Step S3) The translation unit 3 selects translation rules pertinent to the phrase types determined by the determination unit 2, from among those stored in the storage unit 1.

(Step S4) According to the selected translation rules, the translation unit 3 translates the phrases into a plurality of graphical symbol datasets and relationship link datasets.

(Step S5) Based on the graphical symbol datasets and relationship link datasets produced by the translation unit 3, the visualization unit 4 displays a diagram in which a plurality of graphical symbols are interconnected by relationship links.

Figure 3:
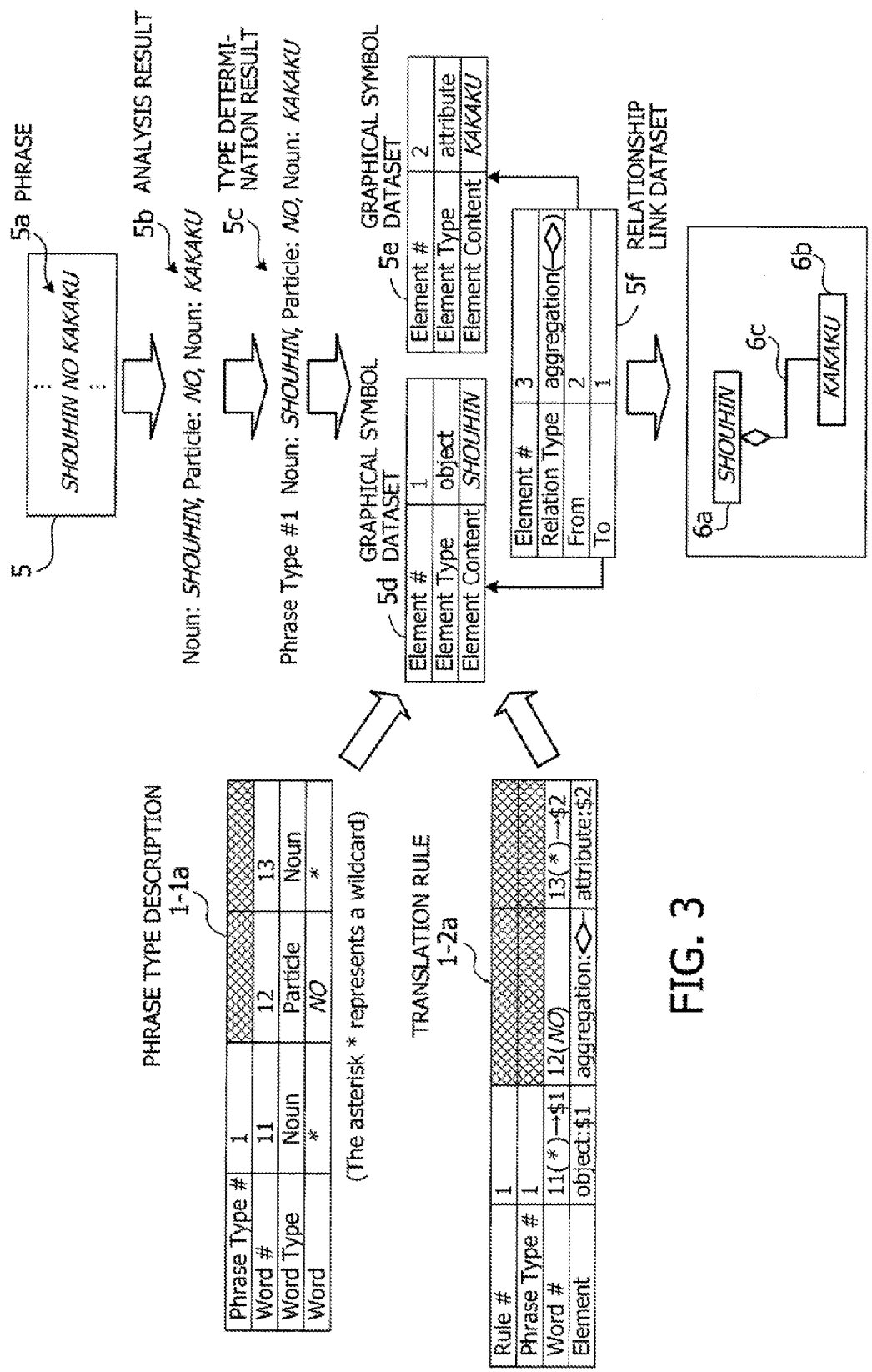
FIG. 3 depicts an example of modeling according to the first embodiment.

FIG. 3 depicts an example of modeling according to the first embodiment. In the example of FIG. 3, a natural-language statement 5 is given as source text. This statement 5 contains a phrase 5a that reads _SHOUHIN NO KAKAKU_ in Japanese (denoting the price of a product). The determination unit 2 divides this phrase 5a into a plurality of words and analyzes each word to determine to what lexical category the word belongs. The determination unit 2 output those words and their respective lexical categories as an analysis result 5b. In the example of FIG. 3, the analysis result 5b givens three words _SHOUHIN_, _NO _, and _KAKAKU_ derived from the input phrase 5a. Specifically, _SHOUHIN_ and _KAKAKU_ are nouns, while _NO_ is a particle.

As seen in FIG. 3, the embodiments discussed herein use the Japanese language as an example of a natural language for describing system specifications. Modern Japanese is written in a mixture of three main writing systems: kanji, hiragana, and katakana. Roman alphabet and numerical symbols may also be used as part of Japanese text. This description of embodiments uses Romanized phonetic expression of Japanese terms and phrases, all capitalized and enclosed by underscores (_), as in _KAKAKU_, for the purpose of distinction from English text. The accompanying drawings, however, italicizes the characters, instead of using underscores as the delimiter. Where appropriate, a Romanized Japanese term or phrase may be followed by its English translation.

It is also noted that the embodiments are not limited to the Japanese text processing illustrated herein. While all languages have their own grammar and syntax, the person skilled in the art would appreciate that the specific embodiments described below can be modified to adapt to other languages.

The determination unit 2 searches the storage unit 1 to find a phrase type description that matches with the analysis result 5b. Referring now to the phrase type description 1-1a seen in the example of FIG. 3, phrase type #1 is defined as a sequence of any noun, particle _NO_, and any noun. The analysis result 5b indicates that the phrase 5a matches with the phrase type description 1-1a in the storage unit 1. Accordingly the determination unit 2 finds this phrase type description 1-1a relevant and thus determines that the phrase 5a belongs to the group of phrase type #1. This classification result 5c is passed from the determination unit 2 to the translation unit 3.

The translation unit 3 selects a translation rule that is pertinent to the phrase type indicated by the received classification result 5c. In the example of FIG. 3, a translation rule 1-2a is selected as being pertinent to phrase type #1. According to the selected translation rule 1-2a, the translation unit 3 translates the phrase 5a into two graphical symbol datasets 5d and 5e and one relationship link dataset 5f. Specifically, the translation rule 1-2a specifies that the first noun in a pertinent phrase is to be the content label of a first graphical symbol of element type "object." The same translation rule 1-2a also specifies that the last noun in the pertinent phrase is to be the content label of a second graphical symbol of element type "attribute." The translation rule 1-2a further specifies a relationship that the second graphical symbol is aggregated into the first graphical symbol.

With the above translation rule 1-2a, the translation unit 3 first produces a graphical symbol dataset 5d that represents a graphical symbol of element type "object" and has the first noun _SHOUHIN_ in the given phrase 5a as its content label. The translation unit produces another graphical symbol dataset 5e that represents a graphical symbol of element type "attribute" and has the last noun _KAKAKU_ in the given phrase 5a as its content label. Further, the translation unit 3 produces a relationship link dataset 5f that represents an aggregation relationship between the two objects by drawing a link from the source symbol given by the graphical symbol dataset 5e to the destination symbol given by the graphical symbol dataset 5d.

Based on the produced graphical symbol datasets 5d and 5e and relationship link dataset 5f, the visualization unit 4 outputs a diagram including two graphical symbols 6a and 6b respectively indicating elements in "object" and "attribute" categories. Seen in the former graphical symbol 6a is the word _SHOUHIN_ representing its content. Similarly, the word _KAKAKU_ is placed in the latter graphical symbol 6b to represent its content. The two graphical symbols 6a and 6b are interconnected by a relationship link 6c. This relationship link 6c starts at the latter graphical symbol 6b and terminates at the former graphical symbol 6a. The terminating end of the relationship link 6c has a special shape indicating that the link represents a relationship of "aggregation" type. Specifically, the relationship link 6c seen in the example of FIG. 3 has a rhombus-shaped end to indicate an aggregation relationship.

The above-described process enables a natural-language source statement to be displayed in graphical form (e.g., UML-compatible diagrams). This capability of generating diagrams is implemented in an information processing apparatus P. The user writes system specifications in a natural language and feeds it to the information processing apparatus P, thereby obtaining a diagram visualizing the system specifications. For example, specifications of a system may be written by business practitioners who have a thorough knowledge of what the system is supposed to provide. The proposed information processing apparatus then permits them to produce a diagram representing their desired system, without the need for help from system engineers. In this way, the present embodiment contributes to improvement in their productivity.

The translation of phrases of a statement produces a plurality of graphical symbol datasets, some of which may share the same content. When the content label of a newly produced graphical symbol dataset coincides with that of an existing graphical symbol dataset, the translation unit 3 furnishes the new graphical symbol dataset with pointer information that points at the existing graphical symbol dataset, rather than outputting the new graphical symbol dataset as an independent dataset. The visualization unit 4, on the other hand, is designed to output a single consolidated graphical symbol dataset for the same content. For example, the visualization unit 4 may reject some graphical symbol datasets when they have pointer information pointing at some other graphical symbol dataset. On the other hand, relationship links pertaining to those rejected graphical symbol datasets will be attached to graphical symbols derived from the graphical symbol datasets pointed at by their pointer information. Accordingly, the resulting diagram properly represents what the source statement describes about the noted content even though it appears in more than two phrases.

The translation unit 3 may be configured to store the produced graphical symbol datasets and relationship link datasets in the storage unit 1 or other storage device. When this is the case, the visualization unit 4 reads graphical symbol datasets and relationship link datasets out of the storage device in response to a user command and produces a diagram from those datasets.

(b) Second Embodiment

Figure 4:
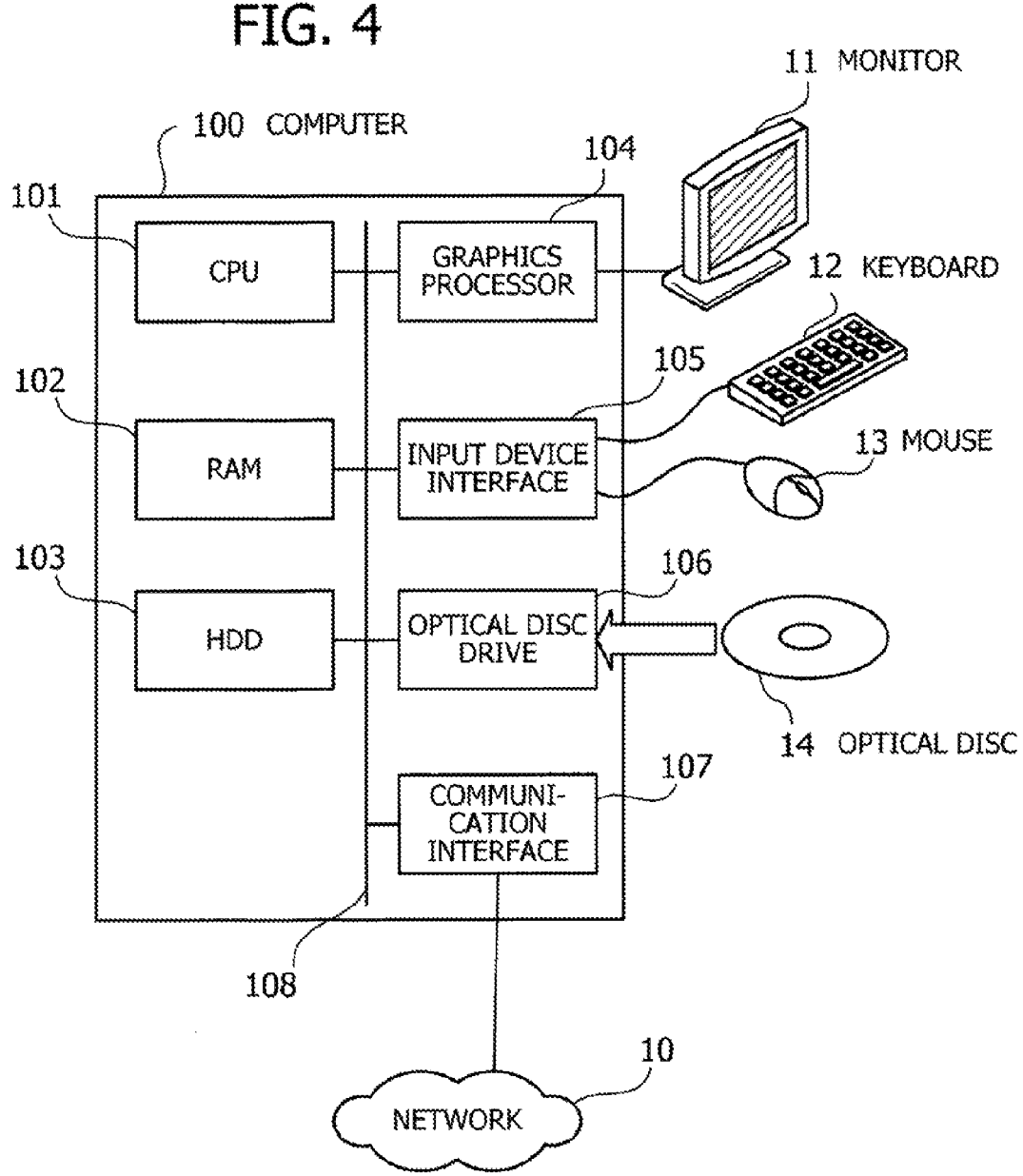
FIG. 4 illustrates an exemplary hardware configuration of a computer as a platform of a second embodiment.

Referring now to FIG. 4 and subsequent drawings, this section will describe a second embodiment designed to enable concurrent generation of a class diagram and an activity diagram of UML.

FIG. 4 illustrates an exemplary hardware configuration of a computer as a platform of the second embodiment. The illustrated computer 100 has a central processing unit (CPU) 101 to control the entire system. Connected to this CPU 101 via a bus 108 are RAM 102 and a plurality of peripheral devices. The RAM 102 serves as primary storage of the computer 100. Specifically, the RAM 102 is used to temporarily store the whole or part of operating system (OS) programs and application programs that the CPU 101 executes, in addition to other various data objects that the CPU 101 manipulates at runtime.

The peripheral devices on the bus 108 include a hard disk drive (HDD) 103, a graphics processor 104, an input device interface 105, an optical disc drive 106, and a communication interface 107. The HDD 103 writes and reads data magnetically on its internal disk media. The HDD 103 serves as secondary storage of the computer 100 to store program and data files of the operating system and applications. Flash memory and other semiconductor memory devices may also be used as secondary storage, similarly to the HDD 103.

The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display. The input device interface 105 is connected to input devices such as a keyboard 12 and a mouse 13 and supplies signals from those devices to the CPU 101. The mouse 13 is a pointing device, which may be replaced with other kinds of pointing devices such as touchscreen, tablet, touchpad, and trackball.

The optical disc drive 106 reads out data encoded on an optical disc 14, by using a laser light. The optical disc 14 is a portable data storage medium, the data recorded on which can be read as a reflection of light or the lack of same. The optical disc 14 may be a digital versatile disc (DVD), DVD-RAM, compact disc read-only memory (CD-ROM), CD-Recordable (CD-R), or CD-Rewritable (CD-RW), for example. The communication interface 107 is coupled to a network 10 to exchange data with other computers (not illustrated).

The above-described hardware platform may be used to realize the processing functions of the second embodiment. The computer hardware of FIG. 4 may also be used as the information processing apparatus discussed in the first embodiment.

Figure 5:
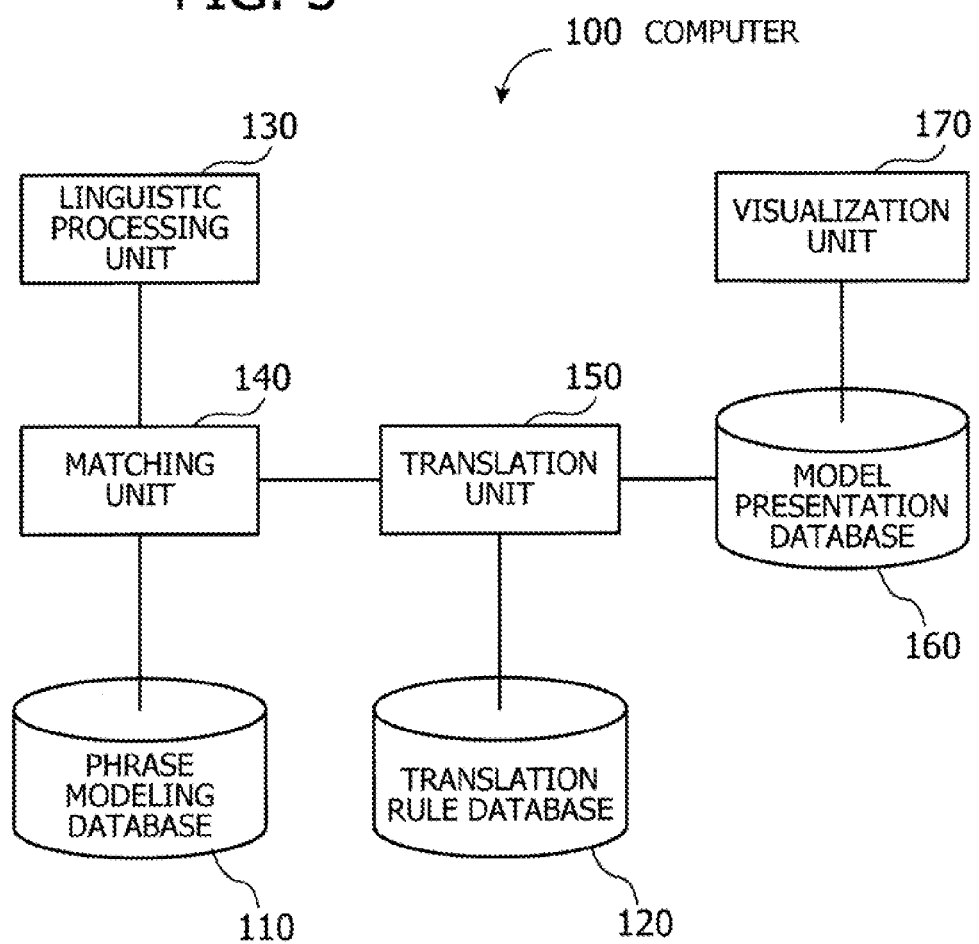
FIG. 5 is a block diagram illustrating an example of modeling functions according to the second embodiment.

FIG. 5 is a block diagram illustrating an example of modeling functions according to the second embodiment. As seen in FIG. 5, the computer 100 includes various functions to perform natural language-based modeling, i.e., producing, for example, class diagrams and activity diagrams from a given natural-language script. Specifically, the computer 100 includes a phrase modeling database 110, a translation rule database 120, a linguistic processing unit 130, a matching unit 140, a translation unit 150, a model presentation database 160, and a visualization unit 170.

The phrase modeling database 110 is a collection of phrase models each describing conditions for a specific structure of natural-language phrases to be applicable for the modeling. For example, a plurality of phrase models are provided to describe different types of phrases. Each phrase model has a unique phrase type number (phrase type #) designating a particular type of phrases. The phrase modeling database 110 may be implemented by using a part of the storage space of, for example, the RAM 102 or HDD 103 discussed in FIG. 4.

The translation rule database 120 is a collection of translation rules each describing how the words of a phrase should be converted to a set of model elements and their relationships when the phrase matches with a specific phrase model. A model element represents, for example, a class in class diagrams or an activity state in activity diagrams. The translation rule database 120 may be implemented by using a part of the storage space of, for example, the RAM 102 or HDD 103 discussed in FIG. 4.

The linguistic processing unit 130 extracts phrases from each source statement written in a natural language and analyzes the extracted phrases in terms of their structure and constituent terms. This analysis of phrases may be achieved by using the techniques of, for example, morphological analysis. Briefly, morphological analysis segments a natural-language sentence into morphemes, the smallest semantically meaningful units, and identify their respective lexical categories (or parts of speech).

The matching unit 140 is supplied with each phrase extracted by the linguistic processing unit 130. The matching unit 140 searches the phrase modeling database 110 to extract a phrase model that fits the supplied phrase and obtains the phrase type number of the extracted phrase model.

The phrase model extracted as matching with the given phrase is given a unique phrase type number for identification. Based on this phrase type number, the translation unit 150 searches the translation rule database 120 of the phrase model and extracts an applicable translation rule for the phrase. Then according to the extracted translation rule, the translation unit 150 translates the given phrase into model elements and stores them in the model presentation database 160. The model presentation database 160 stores a collection of such model elements. The model presentation database 160 may be implemented by using a part of the storage space of, for example, the RAM 102 or HDD 103 discussed in FIG. 4.

Based on the stored model elements in the model presentation database 160, the visualization unit 170 displays a class diagram and an activity diagram on a screen of the monitor 11 or the like to represent system specifications that can be derived from the input statements as a whole.

It is noted that the lines interconnecting the elements seen in FIG. 5 are only an example, and FIG. 5 actually omits some communication paths for simplicity purposes. The person skilled in the art would appreciate that there may be other communication paths in actual implementations. The phrase modeling database 110 in FIG. 5 is an example of what the storage unit 1 in FIG. 1 may accommodate. The same applies also to the translation rule database 120. It is further noted that the linguistic processing unit 130 and matching unit 140 are an example of the functions the determination unit 2 in FIG. 1 may provide. The translation unit 150 in FIG. 5 is an exemplary implementation of the translation unit 3 discussed in FIG. 1. Also, the visualization unit 170 in FIG. 5 is an exemplary implementation of the visualization unit 4 discussed in FIG. 1.

Figure 6:
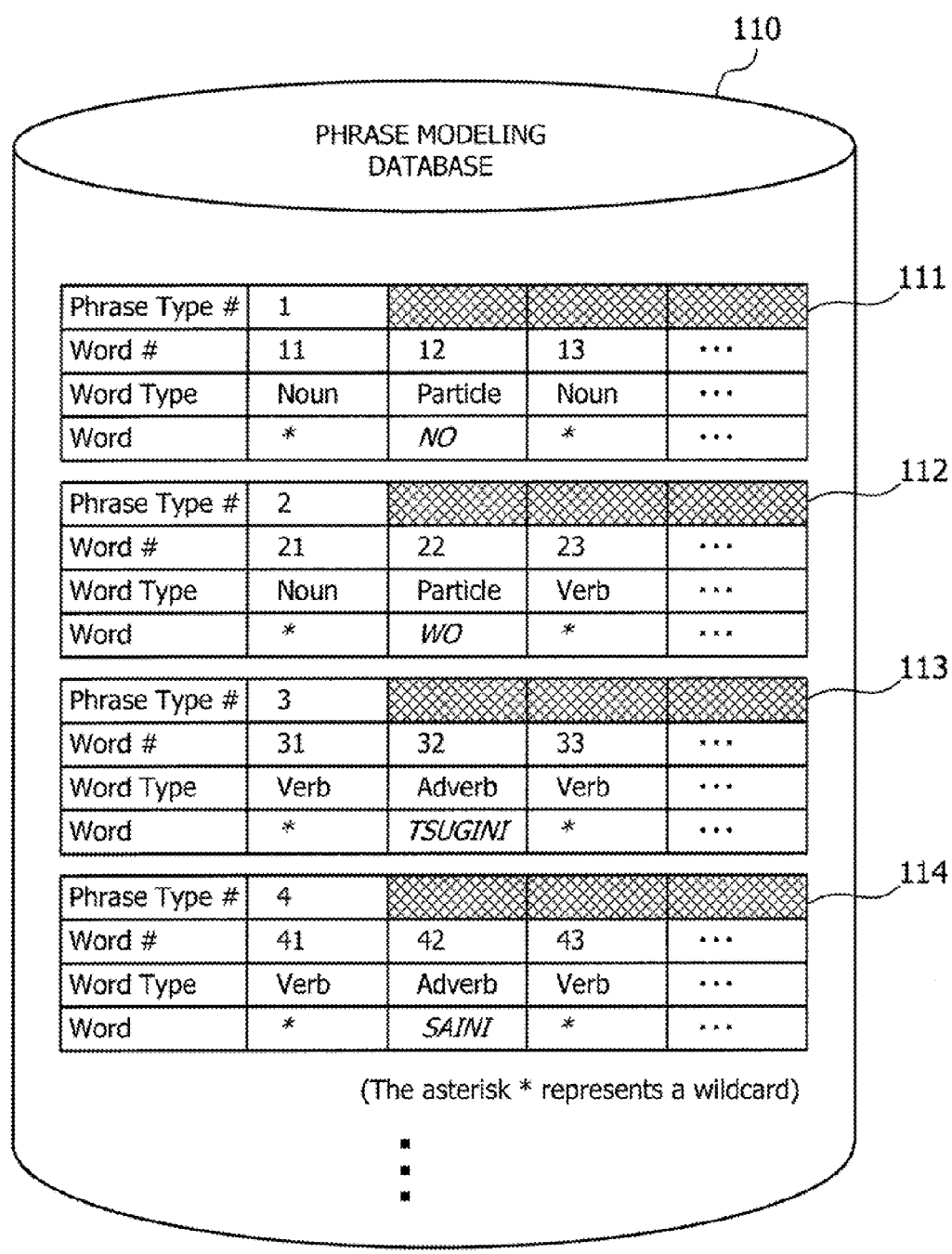
FIG. 6 illustrates an exemplary data structure of a phrase model database.

As mentioned above, the illustrated computer 100 has several databases containing previously provided records. FIG. 6 illustrates an exemplary data structure of a phrase model database. This phrase modeling database 110 stores a plurality of phrase models 111, 112, 113, 114, and so on.

For example, the topmost phrase model 111 in FIG. 6 is formed from four data fields, which are arranged vertically with the following titles: Phrase Type Number (Phrase Type #), Word Number (Word #), Word Type, and Word. The phrase type number field contains an identification (ID) number that indicates a phrase model for a specific type of phrases. The word number field contains an ID number that indicates a specific word contained in the phrase model 111, and the word field and word type field respectively indicate the text value and lexical category of that word. The word field may be defined by using a regular expression. For example, an asterisk (*) may be used as a wildcard in the word field to specify that any word or words can be applied. While the topmost phrase model 111 has been described above, the other phrase models 112, 113, 114, . . . are also organized in the same data structure.

A phrase model is structured as an ordered combination of words defined in the above-described data fields. For example, the topmost phrase model 111 defines a phrase structure in which two nouns with any text values are connected together, with a particle _NO_ between them.

The phrase models 111, 112, 113, 114, . . . in FIG. 6 are an exemplary implementation of the phrase type descriptions 1-1a, 1-1b, 1-1c, . . . discussed in FIG. 1.

FIG. 7 illustrates an exemplary data structure of a translation rule database. The illustrated translation rule database 120 contains a plurality of translation rules 121, 122, 123, 124, and so on. Those translation rules 121, 122, 123, 124, . . . are each formed from the following data fields: Rule Number (Rule #), Phrase Type Number (Phrase Type #), Word Number (Word #), and Element Type Number (Element Type #). The element type number field may be provided in plurality.

The rule number field contains an ID number for designating a translation rule. The phrase type number field contains a phrase type number that indicates to what type of phrases the translation rule applies.

The word number field contains a word number that specifies to which word in the pertinent phrase model the translation rule applies. This word number is followed by a character string indicating the word. An asterisk (*) may be placed to specify that any character string fits into the field. A character string, when it is parenthesized, is to be assigned to a variable pointed at by the right arrow. For example, the translation rule 121 (rule #1) specifies that the leading character string before particle _NO_ is to be assigned to one variable $1, and that the trailing character string after _NO_ is to be assigned to another variable $2. As another example, the second translation rule 122 specifies a character string with a word number of 23. This character string _(*)SURU_ is formed from two parts, one part being parenthesized and the other being not. This means that only the parenthesized part of the character string is to be assigned to the specified variable.

The element type number field contains an ID number that indicates into which type of model element the word is to be translated. A translation rule may have more than two rows for the element type number field, each row being dedicated for a group of model elements that are associated with each other. The ID number of a model element is followed by a parenthesized description of element type and element content. As seen in the example of FIG. 7, most parenthesized descriptions contain two items delimited by a colon (:). These model elements may represent classes in class diagrams or activity states in activity diagrams. In that case, a name specifying an element type is placed on the left of the colon, and its corresponding element content is placed on the right of the colon. Here the element content may be designated by the name of a variable. The specified variable is supposed to give a character string representing the content of a model element to be produced from this translation rule.

The element type number field may also indicate a model element that represents a class-to-class relationship in class diagrams. When this is the case, the type of relationship (e.g., aggregation, reference) is specified on the left of the colon, and the direction of that relationship is specified on the right of the colon. More specifically, an aggregation relationship will be represented by a line having a rhombus-shaped head directed to the destination model element with which the source model element is aggregated. Similarly, a reference relationship will be represented by an arrow whose head is directed to a model element that is referenced by another model element. For example, the second translation rule 122 defines a model element with an element type number of 24. This model element #24 represents an aggregation relationship between one model element #26 and another model element #21 that includes the model element #26 as its constituent part. The second translation rule 122 also defines a model element with an element type number of 25, which represents a reference from one model element #23 to another model element #26.

Some translation rules may define model elements for an activity diagram. Those model elements have, in at least one of their element type number fields, information indicating what activities (e.g., activity edge, sub-activity) are associated with them.

Figure 8:
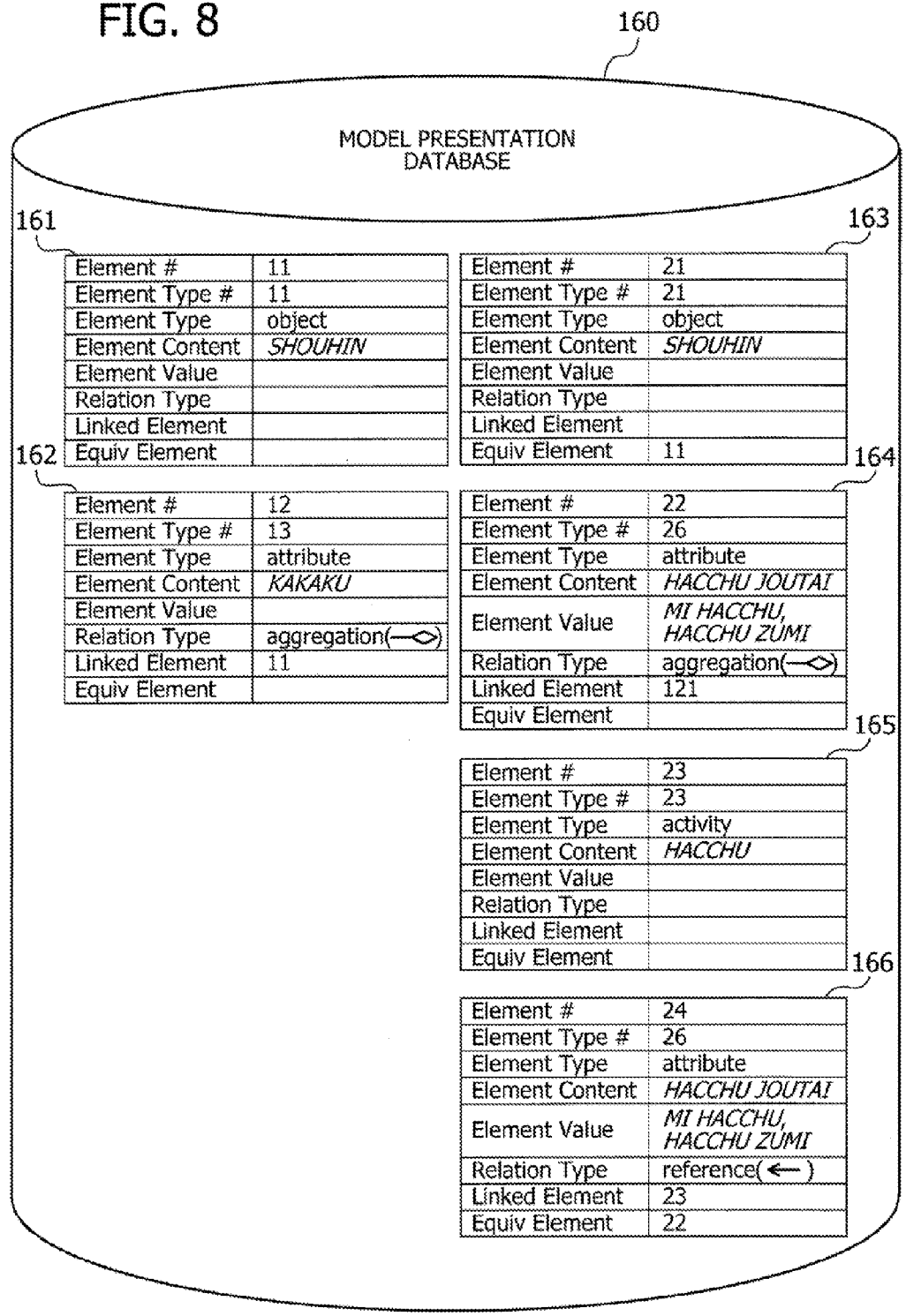
FIG. 8 illustrates an exemplary data structure of a model presentation database.

FIG. 8 illustrates an exemplary data structure of a model presentation database. The illustrated model presentation database 160 contains model elements 161 to 166 produced according to translation rules. The source of these model elements 161 to 166 is a statement 20 illustrated in FIG. 9.

Each model element 161 to 166 is formed from the following data items: Element Number (Element #), Element Type Number (Element Type #), Element Type, Element Content, Element Value, Relation Type, Linked Element, and Equivalent Element (Equiv Element).

The element number field of a model element indicates its ID number. The element type number field and element type field indicate the type of the model element, by type number and type name. The element content field indicates the content, or subject matter, of the model element, and the element value field contains a specific value(s) that the content may take. The relation type field indicates what kind of relationship the model element has with another model element, and the linked element field contains an element number designating that related model element. The equivalent element field contains an element number indicating another similar model element that has the same value in the element content field.

The model elements 161 to 166 illustrated in FIG. 8 are an example of information that encompasses the concept of graphical symbol datasets and relationship link datasets discussed in the first embodiment. For example, the element number field, element type number field, element type field, element content field, element value field, and equivalent element field of those model elements 161 to 166 are an example of the foregoing graphical symbol datasets. Also, the relation type field and linked element field are an example of the foregoing relationship link datasets. The second embodiment, however, provides no explicit data field for specifying a source model element since a relationship link dataset is stored as part of the source model element.

Figure 9:
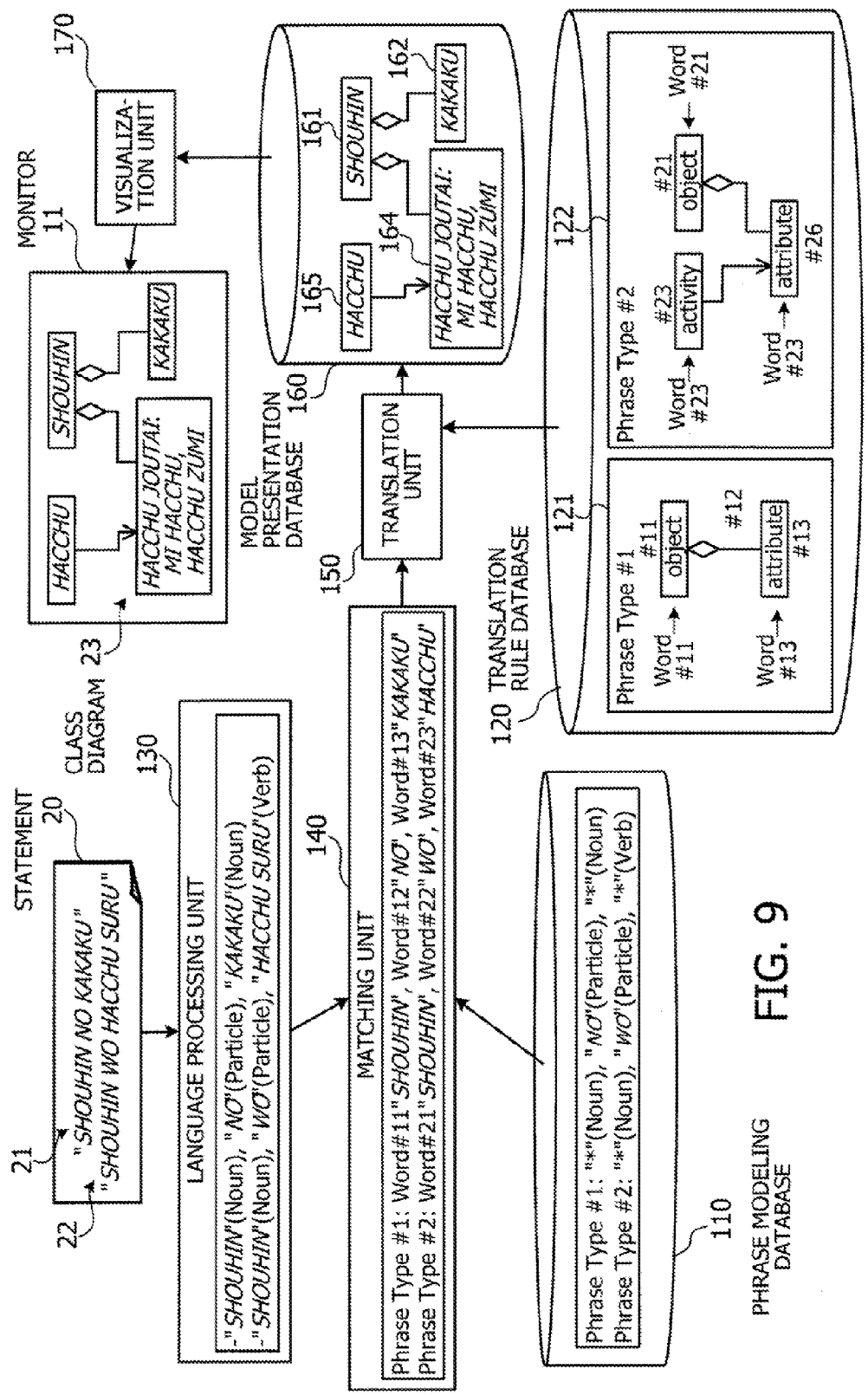
FIG. 9 is a conceptual diagram illustrating an exemplary model generation process according to the second embodiment.

A brief description of a model generation process according to the second embodiment will now be provided below. FIG. 9 is a conceptual diagram illustrating an exemplary model generation process according to the second embodiment. The exemplary process of FIG. 9 begins with a source statement 20 including two phrases 21 and 22 that read _SHOUHIN NO KAKAKU_ (the price of a product) and _SHOUHIN WO HACCHU SURU_ (place a purchase order for the product), respectively. This source statement 20 is subjected to the linguistic processing unit 130. The linguistic processing unit 130 analyzes the phrases 21 and 22 individually by using, for example, the techniques of morphological analysis to divide them into a plurality of words or morphemes. The linguistic processing unit 130 further analyzes each divided word to identify its lexical category. For example, the first phrase 21 is divided into the following three words: noun _SHOUHIN_ (product), particle _NO_, and noun _KAKAKU_ (price). The second phrase 22 is divided into the following words: noun _SHOUHIN_, particle _WO_, and verb _HACCHU SURU_ (place a purchase order).

The matching unit 140 searches the phrase modeling database 110 for phrase models that fit the phrases 21 and 22. In the illustrated example of FIG. 9, the first phrase 21 matches with phrase type #1, and the second phrase 22 matches with phrase type #2. The matching unit 140 associates phrase type numbers #1 and #2 of those relevant phrase models with the respective phrases 21 and 22 analyzed by the linguistic processing unit 130 and sends them all to the translation unit 150.

The translation unit 150 consults the translation rule database 120 to retrieve translation rules corresponding to the analyzed phrases 21 and 22 by using their respective phrase type numbers. The translation unit 150 translates the phrases 21 and 22 into model form according to each corresponding translation rule.

Referring to the translation rule database 120 in FIG. 9, translation rules 121 and 122 represent two classes of model elements, each element having an indication of its element type (e.g., object, attribute, activity). As seen in the model presentation database 160, a model is built in the form of a class diagram created from the foregoing model elements 161 to 166 of FIG. 8. Specifically, four model elements 161, 162, 165, and 166 represent different classes of elements, each having an indication of its specific element content.

For example, the first phrase 21 is processed with a translation rule 121. This translation rule 121 specifies that a word corresponding to word #11 in the given phrase 21 will be the element content of an object-class model element. The same translation rule 121 also specifies that another word corresponding to word #13 in the given phrase 21 will be the element content of an attribute-class model element. The translation rule 121 further specifies that a relationship link is to be produced to indicate that the attribute-class model element is a constituent part of the object-class model element. The translation unit 150 applies the translation rule 121 to the first phrase 21, thereby producing model elements 161 and 162 linked together by their aggregation relationship. Similarly, the translation unit 150 subjects the second phrase 22 to another translation rule 122, thus producing model elements 163 to 166 seen in FIG. 8. The model presentation database 160 stores the resulting model elements 161 to 166, based on which the visualization unit 170 displays a class diagram 23 on a screen of the monitor 11.

It is noted that the third model element 163 in FIG. 8 is equivalent to the first model element 161 as indicated by the element number "11" in its equivalent element field. Accordingly, these two model elements 161 and 163 in FIG. 8 are consolidated into one model element 161 in the class diagram 23. The fourth model element 164 in FIG. 8 is an attribute-class element representing the status of another model element (_HACCHU_ in this case), which may take an element value of _MI HACCHU_ (purchase order is pending) or _HACCHU ZUMI_ (purchase order has been placed). The sixth model element 166 in FIG. 8 is equivalent to the first model element 164 as indicated by the element number "22" in its equivalent element field. Accordingly, these two model elements 164 and 166 in FIG. 8 are consolidated into one model element 164 in the class diagram 23.

As can be seen from the above example of FIGS. 8 and 9, the second embodiment makes it possible to produce a class diagram 23 from a source statement 20 written in a natural language. The next section will provide more details about the modeling process according to the second embodiment.

Figure 10:
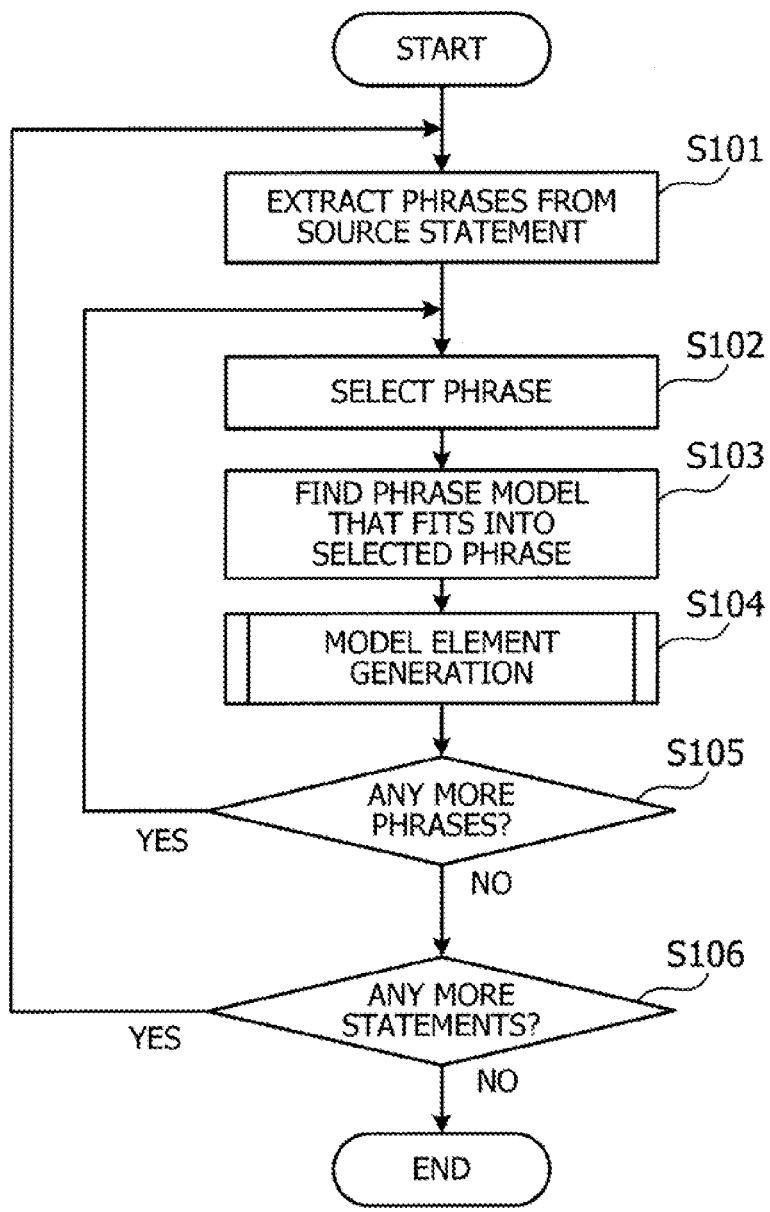
FIG. 10 is a flowchart illustrating an exemplary modeling procedure.

FIG. 10 is a flowchart illustrating an exemplary modeling procedure. Each step of FIG. 10 will be described below in the order of step numbers.

(Step S101) The linguistic processing unit 130 analyzes a given source statement to extract its constituent phrases. During this course, the linguistic processing unit 130 divides each extracted phrase into a plurality of words, as well as identifying their respective lexical categories.

(Step S102) The matching unit 140 selects one pending phrase from among the phrases that the linguistic processing unit 130 has extracted.

(Step S103) The matching unit 140 searches the phrase modeling database 110 to find a phrase model that fits into the currently selected phrase.

(Step S104) When a relevant phrase model is found for the selected phrase, the translation unit 150 uses its phrase type number to obtain a translation rule associated with that phrase model. According to the obtained translation rule, the translation unit 150 produces model elements from the selected phrase. The visualization unit 170 outputs the produced model elements by using graphical symbols and connection lines (relationship links). The details of this step will be described later with reference to FIG. 11.

(Step S105) The matching unit 140 determines whether there are any other pending phrases. When a pending phrase is found, the matching unit 140 returns to step S102. When there are no pending phrases, the matching unit 140 proceeds to step S106.

(Step S106) The linguistic processing unit 130 determines whether there are any other pending statements. When a pending statement is found, the linguistic processing unit 130 returns to step S101. When there are no pending statements, the linguistic processing unit 130 terminates the present processing.

Figure 11:
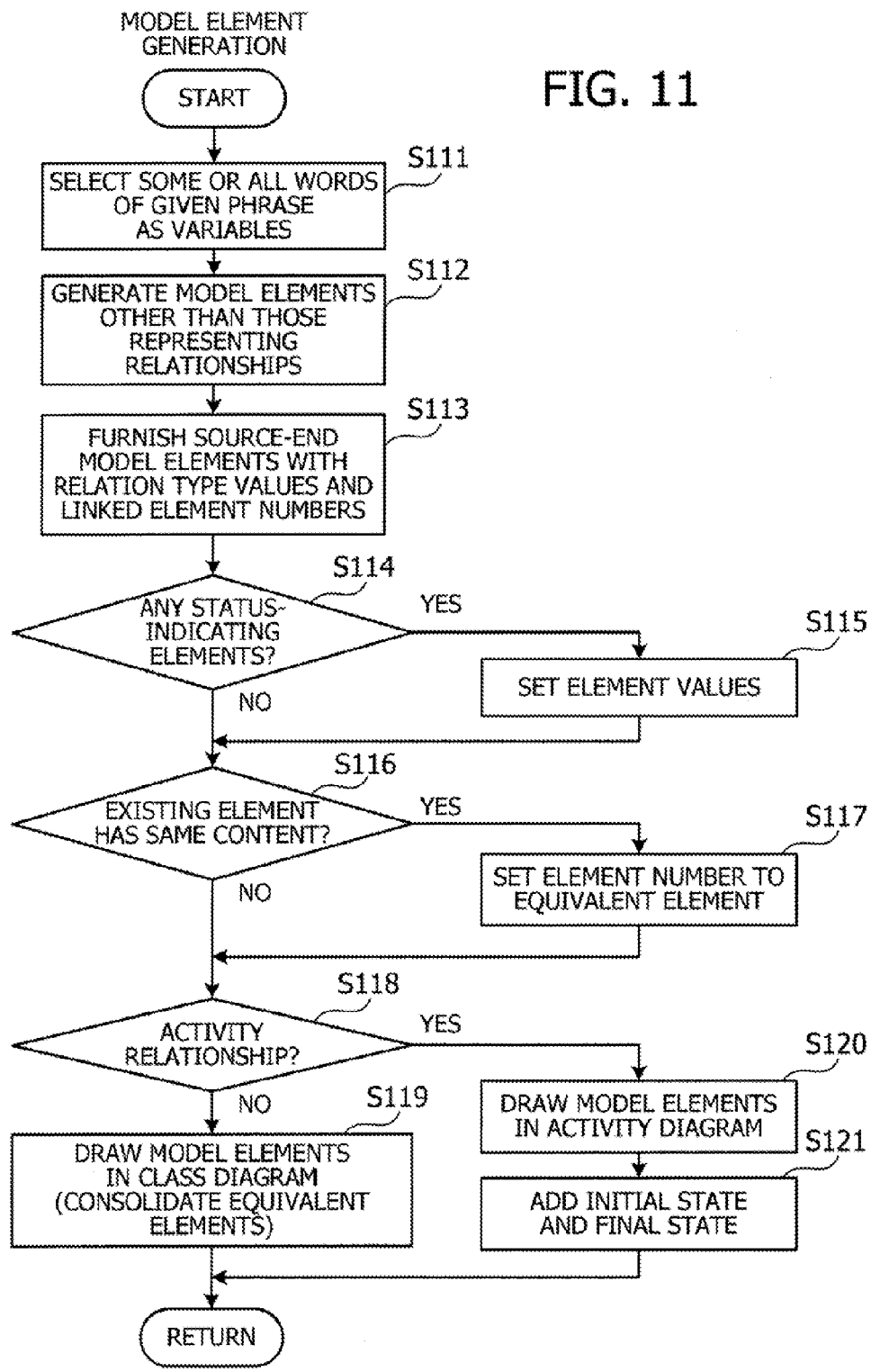
FIG. 11 is a flowchart illustrating a model element generation process.

Referring now to FIG. 11, the model element generation of step S104 will be described in detail below. FIG. 11 is a flowchart illustrating how the translation unit 150 performs a model element generation process. Each step of FIG. 11 will be described below in the order of step numbers.

(Step S111) The foregoing step S103 of FIG. 10 has searched for and found a relevant phrase model. The translation unit 150 selects a translation rule corresponding to the phrase type number of that phrase model, out of those stored in the translation rule database 120. The selected translation rule is supposed to apply to the phrase selected at step S102 of FIG. 10. The selected translation rule may specify some words in the phrase as variables. The translation unit 150 extracts such words and assigns them to relevant variables defined in the translation rule.

(Step S112) The selected translation rule may include some element type numbers to specify specific model elements. The translation unit 150 produces such model elements specified in the selected translation rule, but other than those representing relationships. For example, "aggregation," "reference," "activity edge," and "sub-activity" are among the model elements representing element-to-element relationships. The translation unit 150 produces model elements, each with a specific element type and element content specified in the selected translation rule. In the case where the element content is defined in the form of a variable, the translation unit 150 uses the variable value assigned at step S111 as the element content. The translation unit 150 also gives each produced model element a unique element number to distinguish it from others.

(Step S113) Some of the model elements produced at step S112 are designated as the source end of a relationship. The translation unit 150 furnishes those model elements with their respective relation type values and linked element numbers.

(Step S114) The translation unit 150 determines whether the model elements produced at step S112 include those representing some status as their element content. For example, such model elements may be found by checking the last word in their element content field. If its last word reads _JOUTAI_ (status), then the model element is a status-indicating model element, and the translation unit 150 proceeds to step S115 accordingly.

If there are no such model elements, the translation unit 150 advances to step S116.

(Step S115) The translation unit 150 furnishes the status-indicating model elements with detailed element values. Specifically, the translation unit 150 extracts a character string before _JOUTAI_ from the text in the element content field. For example, the translation unit 150 extracts a character string _HACCHU_ (purchase order) from the element content field that reads _HACCHU JOUTAI_ (purchase order status). The translation unit 150 then produces two element values from the extracted character string, one by adding a prefix _MI_ to the character string to indicate a pending state, and the other by adding a suffix _ZUMI_ to the character string to indicate a completed state. In the present example, two element values _MI HACCHU_ and _HACCHU ZUMI_ are produced from the leading character string _HACCHU_ of the element content _HACCHU JOUTAI_. The translation unit 150 sets element values to the status-indicating model elements in this way.

(Step S116) The translation unit 150 determines whether any of the new model elements produced at step S112 matches with an existing model element in terms of the element content. If there is such existing model elements, the translation unit 150 advances to step S117. If not, the translation unit 150 proceeds to S118.

(Step S117) The translation unit 150 sets the element number of such an existing model element to the pertinent new model element produced at step S112.

(Step S118) The visualization unit 170 determines whether the translation rule selected at step S111 specifies an activity relationship. If an activity relationship is specified, the visualization unit 170 advances to step S120. If not, the visualization unit 170 proceeds to step S119.

(Step S119) The visualization unit 170 displays a class diagram including model elements produced by the above processing of steps S112 to S118. Some of the produced model elements may have a specific element number in their equivalent element field, and the visualization unit 170 consolidates those model elements into the model element specified by the element number when producing a class diagram.

(Step S120) The visualization unit 170 finds model elements having activity relationships (e.g., those representing activity status) and compiles those model elements into an activity diagram.

(Step S121) The visualization unit 170 adds an initial state and a final state to the activity diagram.

The above processing of FIG. 11 makes it possible to produce a class diagram and an activity diagram automatically from given natural-language statements that describe system specifications. The next section will now present a more specific example of class and activity diagrams produced in that way.

FIG. 12 illustrates an example of natural-language statements which describe how the system is used. The illustrated statements 30 include the following nine phrases:

(1) _KOUJI NO NICHIJI_
(2) _KOUJI NO BASHO_
(3) _KOUJI NO TANTOUSHA_
(4) _TANTOUSHA NO SHIMEI_
(5) _KOUJI WO JUCHU SURU_
(6) _KOUJI WO TEHAI SURU_
(7) _TANTOUSHA WO WARIATE SURU_
(8) _JUCHU SHITA TSUGINI TEHAI SURU_
(9) _TEHAI SURU SAINI WARIATE SURU_

Upon receipt of those statements 30, the linguistic processing unit 130 divides them into individual phrases. The linguistic processing unit 130 further analyzes each phrase into words (e.g., morphemes) and identifies the lexical category of each word.

FIG. 13 illustrates an exemplary analysis result obtained by the linguistic processing unit 130. Specifically, the above nine phrases constituting the statements 30 are analyzed into the following words and lexical categories:

(1) Noun: _KOUJI_, Particle: _NO_, Noun: _NICHIJI_
(2) Noun: _KOUJI_, Particle: _NO_, Noun: _BASHO_
(3) Noun: _KOUJI_, Particle: _NO_, Noun: _TANTOUSHA_
(4) Noun: _TANTOUSHA_, Particle: _NO_, Noun: _SHIMEI_
(5) Noun: _KOUJI_, Particle: _WO_, Verb: _JUCHUU SURU_
(6) Noun: _KOUJI_, Particle: _WO_, Verb: _TEHAI SURU_
(7) Noun: _TANTOUSHA_, Particle: _WO_, Verb: _WARIATE SURU_
(8) Verb: _JUCHUU SHITA_, Adverb: _TUGI NI_, Verb: _TEHAI SURU_
(9) Verb: _TEHAI SURU_, Adverb: _SAI NI_, Verb: _WARIATE SURU_

The above phrase analysis result is then passed from the linguistic processing unit 130 to the matching unit 140. The matching unit 140 determines the phrase type of each given phrase by using the foregoing phrase modeling database 110 (see FIG. 6).

FIG. 14 illustrates an exemplary result of phrase type determination. The illustrated determination result 32 includes phrase type numbers (Phrase Type #) that indicate the phrase type of each phrase. In the example of FIG. 14, phrases (1) to (4) are of Phrase Type #1. Phrases (5) to (7) are of Phrase Type #2. Phrase (8) is of Phrase Type #3. Phrase (9) is of Phrase Type #4.

The above determination result 32 is passed from the matching unit 140 to the translation unit 150. The translation unit 150 translates each given phrase into model elements according to a translation rule selected based on the type of the phrase. An example of such model elements will be described below, assuming that phrases (1) to (8) seen in the determination result 32 of FIG. 14 are subjected to the translation processing in that order.

Figure 15:
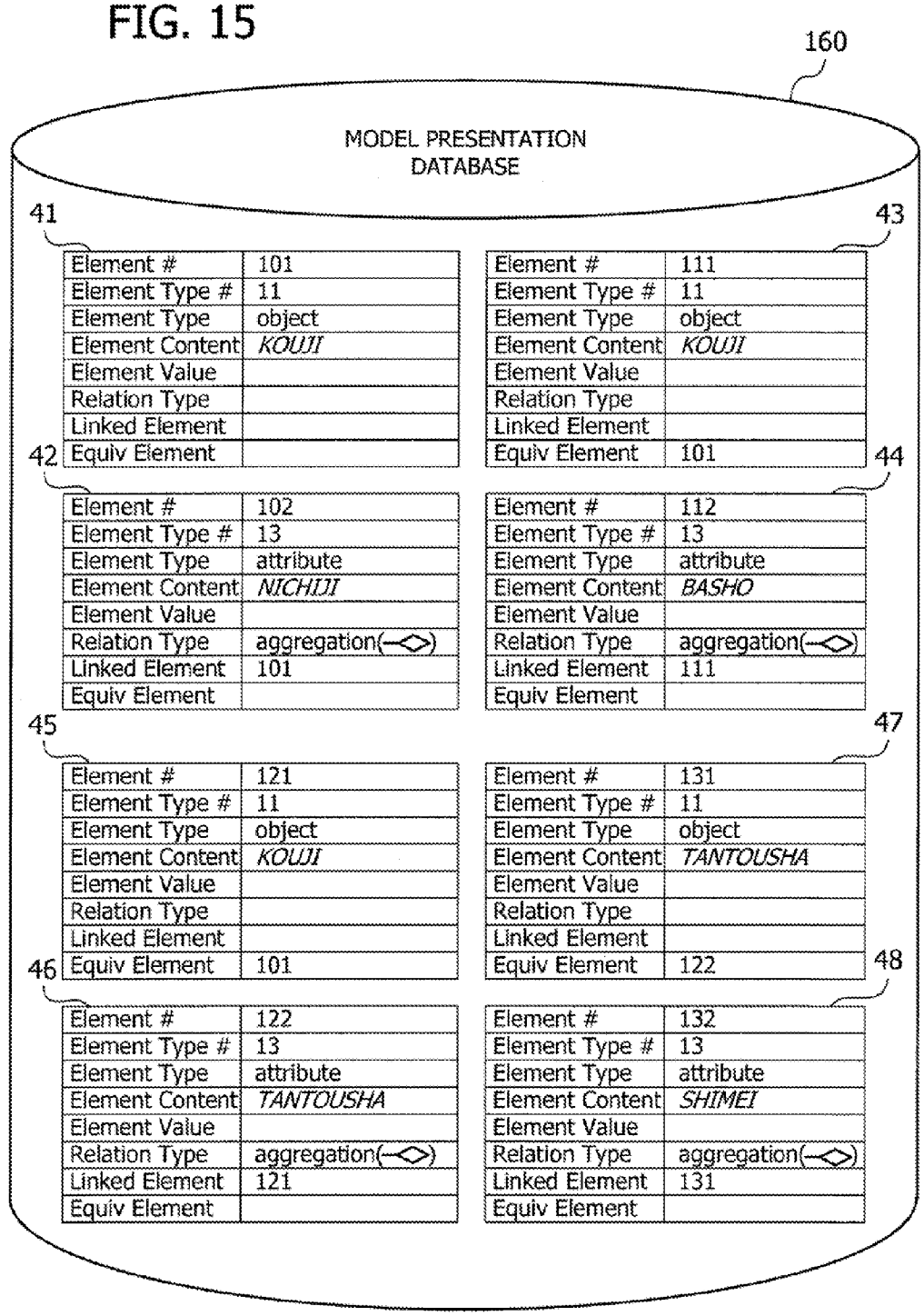
FIG. 15 is a first diagram illustrating exemplary model elements produced by translation.

FIG. 15 is a first diagram illustrating exemplary model elements produced by the above phrase translation. Specifically, FIG. 15 illustrates model elements 41 to 48 translated from phrases (1) to (4). The first two model elements 41 and 42 have been produced from phrase (1) by using a translation rule 121. The next two model elements 43 and 44 have been produced from phrase (2) similarly by using the translation rule 121. The next two model elements 45 and 46 have been produced from phrase (3) similarly by using the translation rule 121. The last two model elements 47 and 48 have been produced from phrase (4) similarly by using the translation rule 121.

The first and second model elements 41 and 42 have existed at the time of production of the third model element 43. The content of the third model element 43 is _KOUJI_ (construction), which matches with the existing model element 41. Accordingly, the third model element 43 contains an element number "101" in its equivalent element field to indicate equivalence to the first model element 41.

Figure 16:
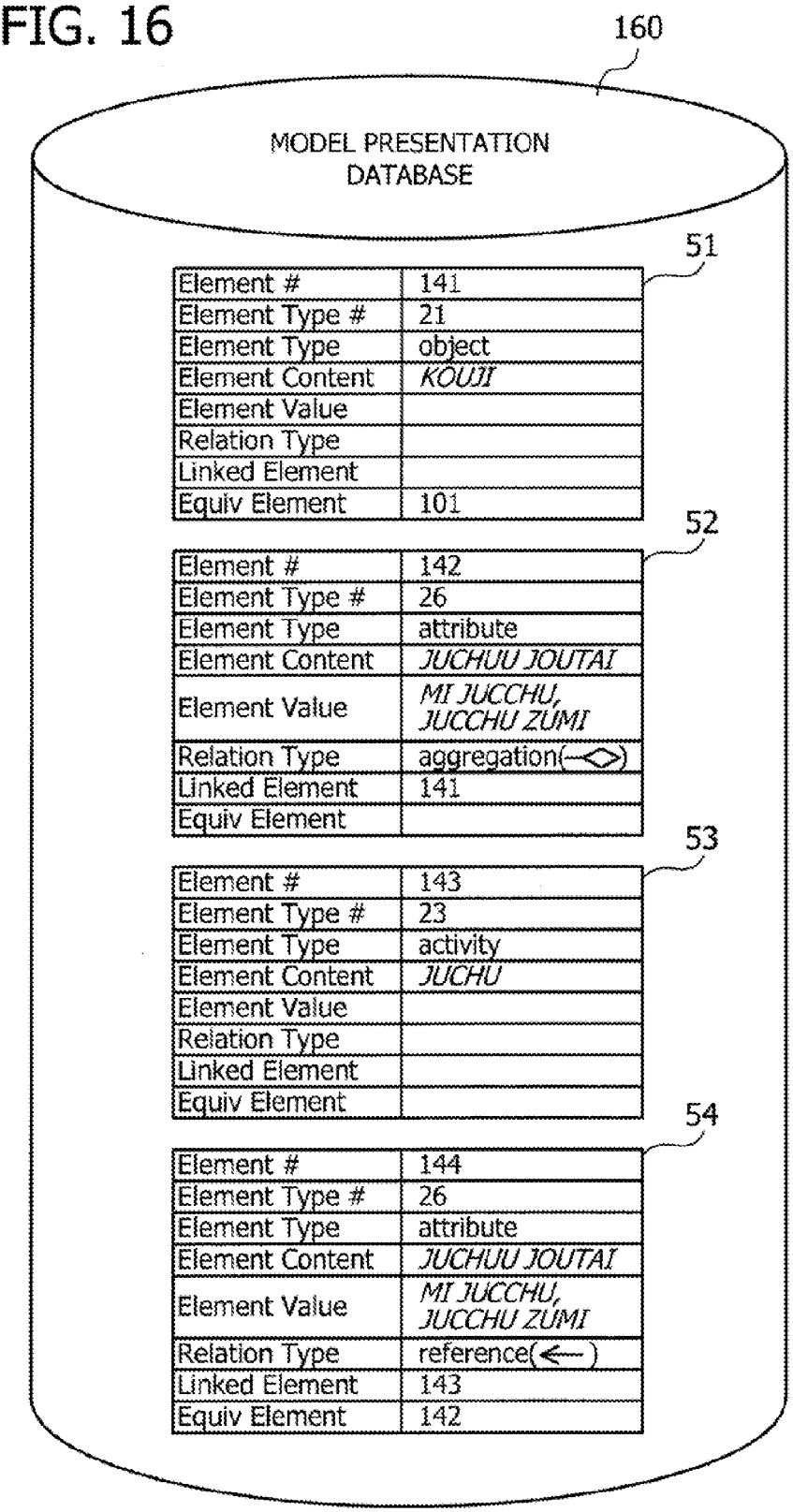
FIG. 16 is a second diagram illustrating exemplary model elements produced by translation.

FIG. 16 is a second diagram illustrating exemplary model elements produced by the above phrase translation. Specifically, FIG. 16 illustrates model elements 51 to 54 translated from phrase (5) according to the translation rule 122. The content field of the fourth model element 54 reads _JUCHUU JOUTAI_ (incoming order status), which matches with that of the second model element 52. Accordingly, the fourth model element 54 contains an element number "142" in its equivalent element field to indicate equivalence to the second model element 52. These two model elements 52 and 54 contain _MI JUCCHU_ (order is not received) and _JUCCHU ZUMI_ (order is received) in their element value field since they represent _JOUTAI_ (status).

Figure 17:
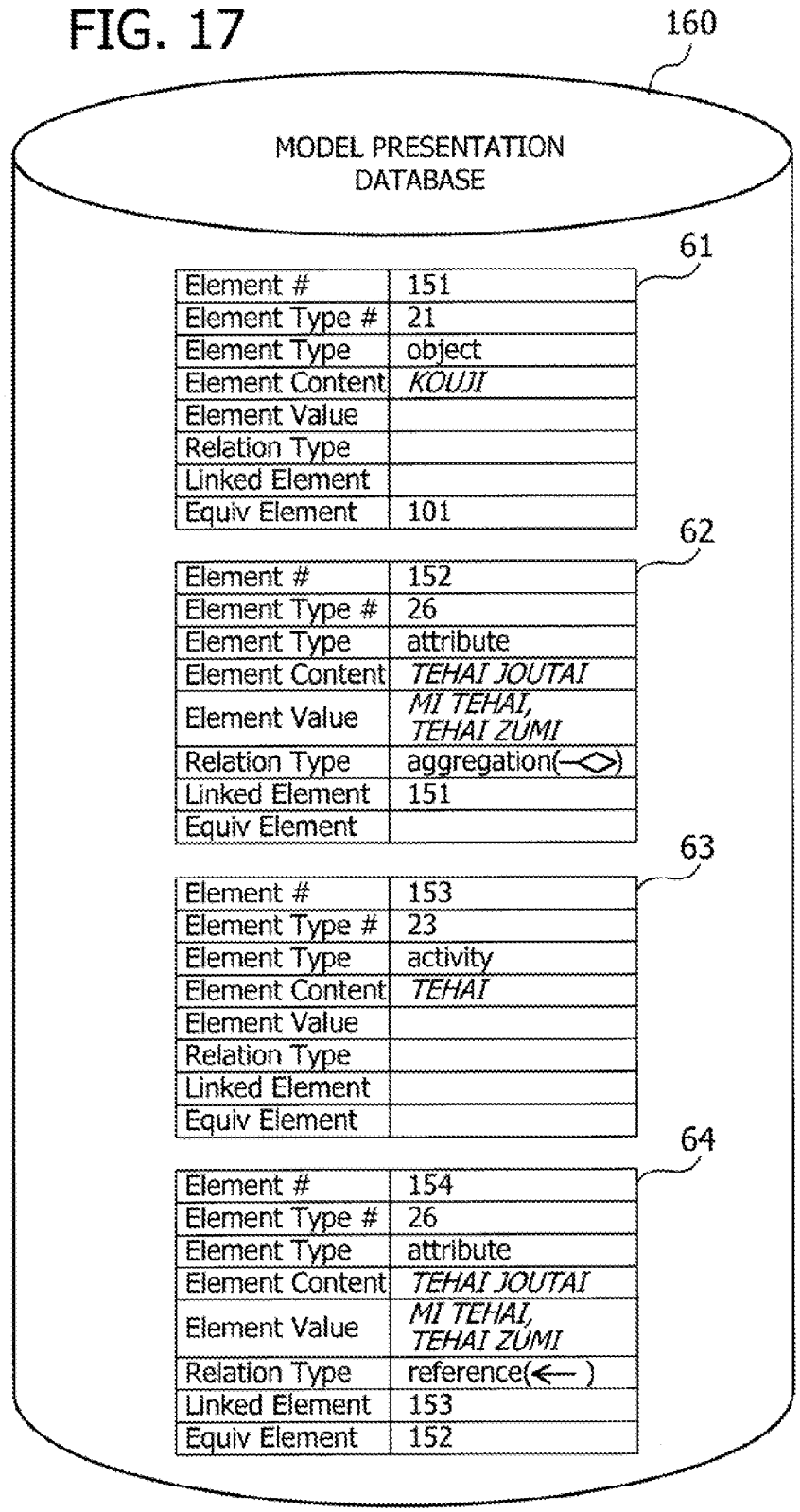
FIG. 17 is a third diagram illustrating exemplary model elements produced by translation.

FIG. 17 is a third diagram illustrating exemplary model elements produced by the above phrase translation. Specifically, FIG. 17 illustrates model elements 61 to 64 translated from phrase (6) according to a translation rule 122. The content field of the fourth model element 64 reads _TEHAI JOUTAI_ (arrangement status), which matches with that of the second model element 62. Accordingly, the fourth model element 64 contains an element number "152" in its equivalent element field to indicate equivalence to the second model element 62. These two model elements 62 and 64 contain _MI TEHAI_ (not arranged) and _TEHAI ZUMI_ (arranged) in their element value field since they represent _JOUTAI_ (status).

Figure 18:
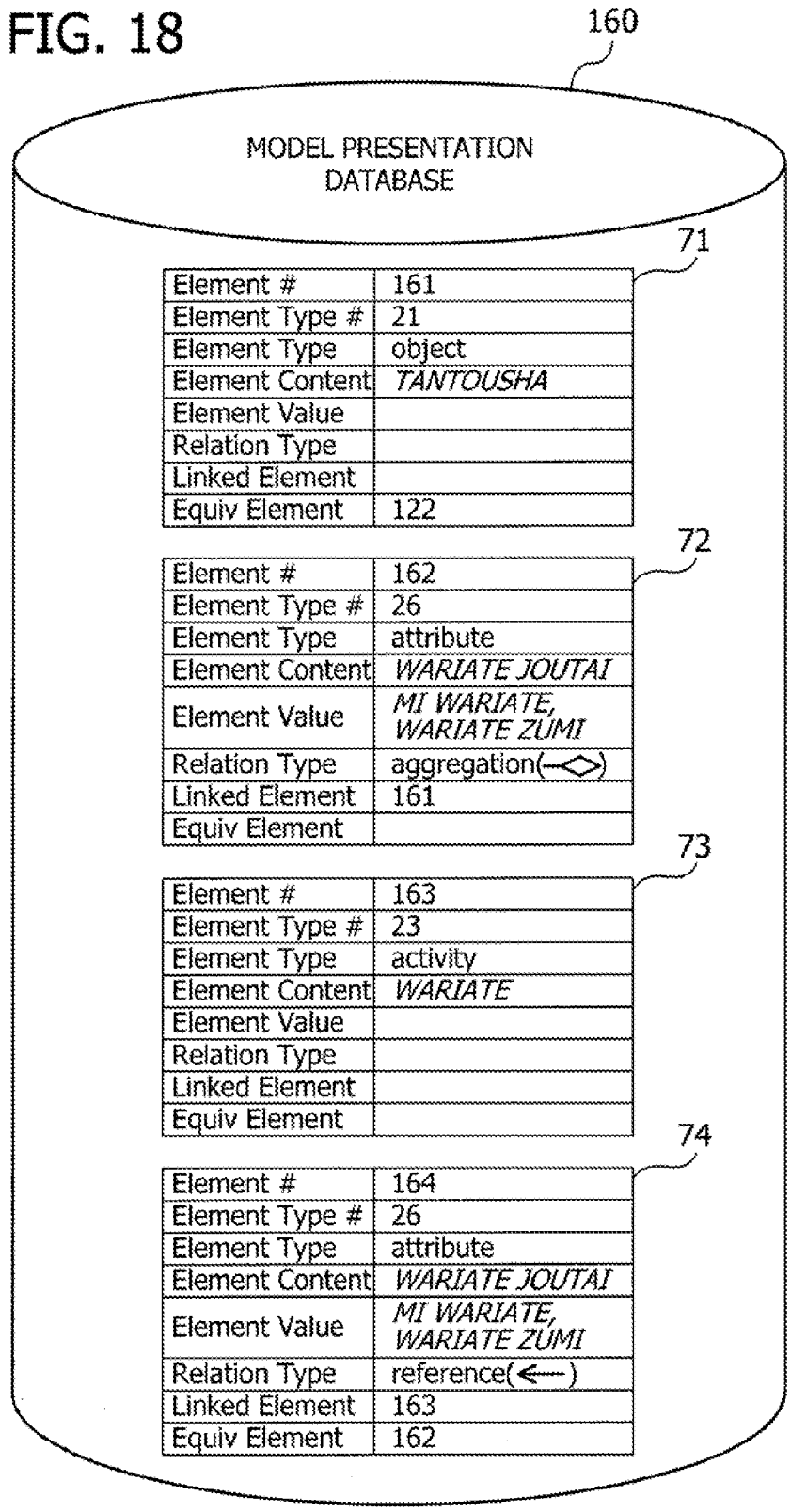
FIG. 18 is a fourth diagram illustrating exemplary model elements produced by translation.

FIG. 18 is a fourth diagram illustrating exemplary model elements produced by the above phrase translation. Specifically, FIG. 18 illustrates model elements 71 to 74 translated from phrase (7) according to a translation rule 122. The content field of the fourth model element 74 reads _WARIATE JOUTAI_ (allocation status), which matches with that of the second model element 72. Accordingly, the fourth model element 74 contains an element number "162" in its equivalent element field to indicate equivalence to the second model element 72. These two model elements 72 and 74 contain _MI WARIATE_ (not allocated) and _WARIATE ZUMI_ (allocated) in their element value field since they represent _JOUTAI_ (status).

Figure 19:
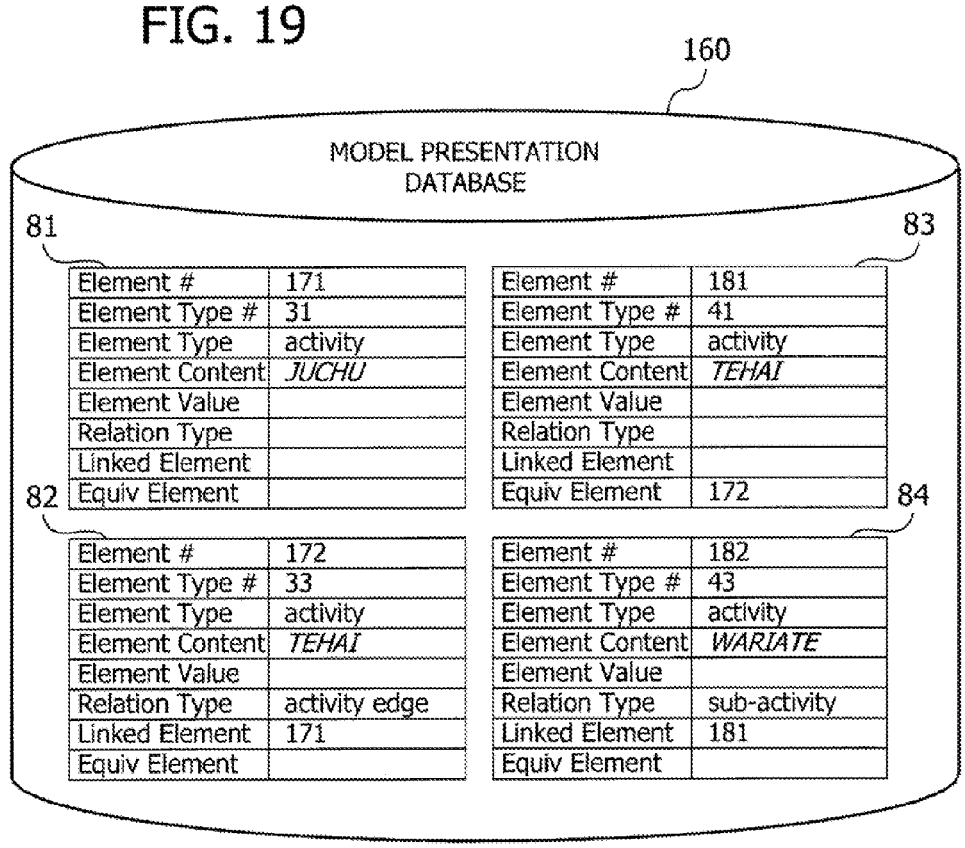
FIG. 19 is a fifth diagram illustrating exemplary model elements produced by translation.

FIG. 19 is a fifth diagram illustrating exemplary model elements produced by the above phrase translation. Specifically, FIG. 19 illustrates model elements 81 to 84 translated from phrases (8) and (9). The first two model elements 81 and 82 have been produced from phrase (8) by using a translation rule 123. The second two model elements 83 and 84 have been produced from phrase (9) similarly by using the translation rule 124.

Figure 20:
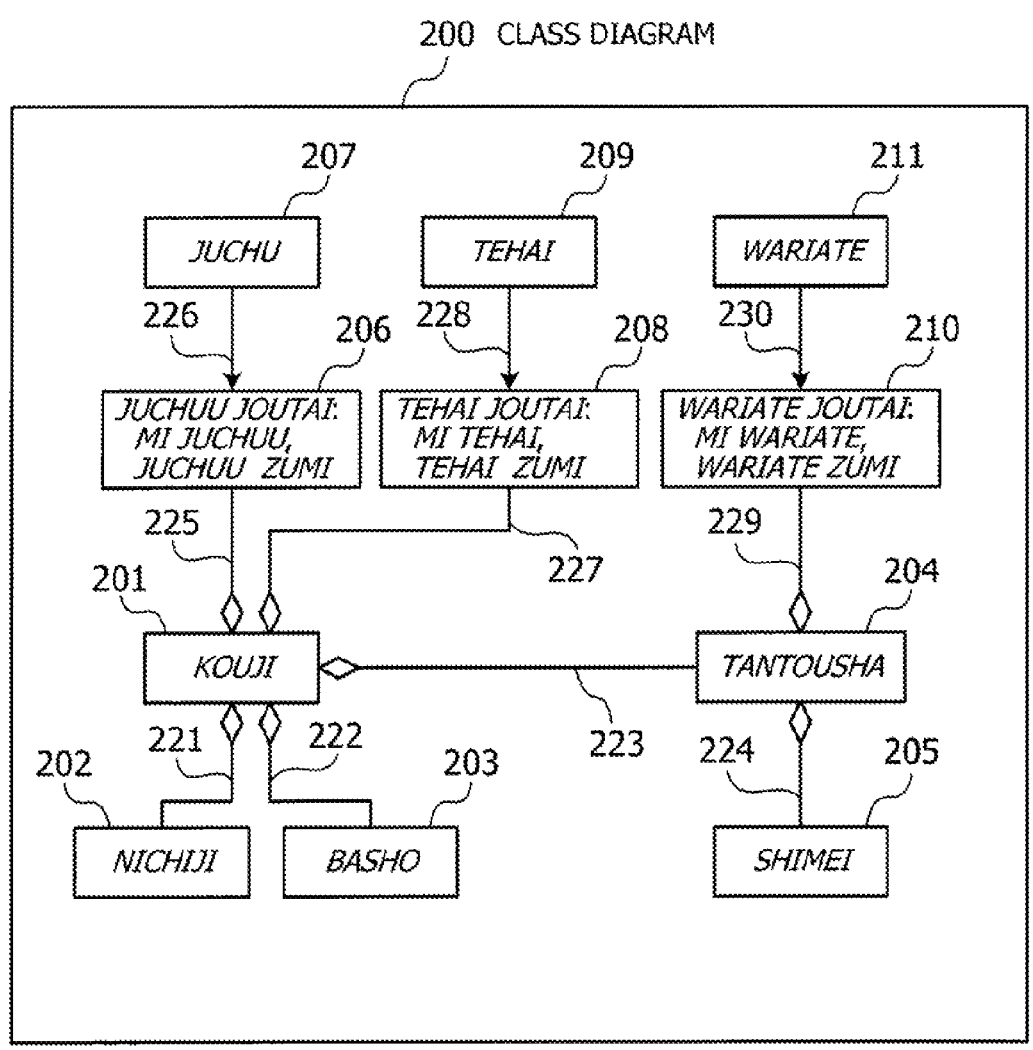
FIG. 20 illustrates an exemplary class diagram that is displayed on a monitor screen.

Based on the model elements described above in FIGS. 15 to 19, the visualization unit 170 displays one or more diagrams on a screen of the monitor 11 to make a graphical presentation. For example, FIG. 20 illustrates a class diagram that may be displayed on a monitor screen. The visualization unit 170 produces this class diagram 200 from the above-described model elements of FIGS. 15 to 19, but excluding model elements 81 to 84 (FIG. 19) that define relationships of activities. The resulting class diagram 200 depicts a plurality of classes 201 to 211 and a plurality of connection lines 221 to 230 representing relationship links between the classes. More specifically, connection lines 221 to 225, 227, and 229 represent aggregation relationships by using a rhombus as their end shape. Connection lines 226, 228, and 230, on the other hand, represent reference relationships by using an arrow head as their end shape.

The class diagram 200 includes classes 201 to 205 and connection lines 221 to 224 that have been produced on the basis of model elements 41 to 48 seen in FIG. 15. More specifically, the class 201 has been produced on the basis of one model element 41, which also corresponds to other model elements 43, 45, and 46 having the element number of the model element 41 in their equivalent element field. Similarly, the class 202 and connection line 221 have been produced on the basis of another model element 42.

The class 203 and connection line 222 have been produced on the basis of yet another model element 44. While this model element 44 includes a link to a model element 43, the linked model element 43 specifies the model element 41 as its equivalent element. Accordingly, the connection line 222 starts at the class 203 based on the source model element 44 and terminates at the class 201 based on the linked model element 41.

The class 204 and connection line 223 have been produced on the basis of still another model element 46. While this model element 46 includes a link to a model element 45, the linked model element 45 specifies the model element 41 as its equivalent element. Accordingly, the connection line 223 starts at the class 204 based on the source model element 46 and terminates at the class 201 based on the linked model element 41.

The class 205 and connection line 224 have been produced on the basis of still another model element 48. While this model element 48 includes a link to a model element 47, the linked model element 47 specifies the model element 46 as its equivalent element. Accordingly, the connection line 224 is drawn from the class 205 based on the source model element 48 to the class 204 based on the linked model element 46.

The class diagram 200 of FIG. 20 further includes classes 206 and 207 and connection lines 225 and 226 that have been produced on the basis of model elements 51 to 54 seen in FIG. 16. More specifically, the class 206 and connection line 225 have been produced on the basis of one model element 52 in FIG. 16. While this model element 52 includes a link to a model element 51, the linked model element 51 specifies the foregoing model element 41 as its equivalent element. Accordingly, the connection line 225 starts at the class 206 based on the source model element 52 and terminates at the class 201 based on the linked model element 41. It is also noted that the class diagram 200 contains no particular symbols for the model element 51 because of its equivalence to the model element 41.

The class 207 and connection line 226 have been produced on the basis of other model elements 53 and 54 in FIG. 16. The latter model element 54 includes a reference relationship with the model element 53 as seen in its relation type field and linked element field, but specifies the foregoing model element 52 as its equivalent element. The connection line 226 is thus the sole thing that is derived purely from the model element 54. Specifically, the connection line 226 is drawn between the class 206 derived from the model element 52 (equivalent element) and the class 207 derived from the model element 53 (linked element).

The class diagram 200 of FIG. 20 includes classes 208 and 209 and connection lines 227 and 228 that have been produced on the basis of model elements 61 to 64 seen in FIG. 17. Likewise, the class diagram 200 of FIG. 20 includes classes 210 and 211 and connection lines 229 and 230 that have been produced on the basis of model element 71 to 74 seen in FIG. 18. Visualization of these classes 208 to 211 and connection lines 227 to 230 may be achieved by using the same procedure discussed above for the classes 206 and 207 and connection lines 225 and 226 based on the model element 51 to 54 of FIG. 16. As a result of the above processing, the illustrated class diagram 200 appears on a screen of the monitor 11, for example.

Figure 21:
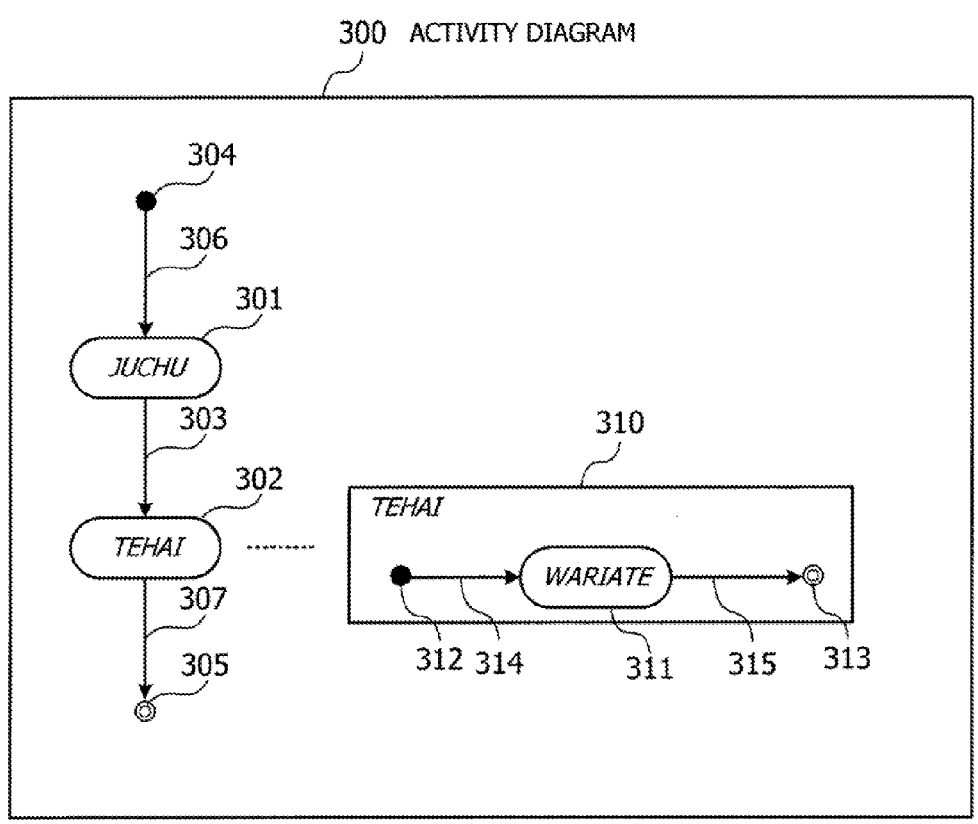
FIG. 21 illustrates an exemplary activity diagram that is displayed on a monitor screen.

FIG. 21 illustrates an exemplary activity diagram that is displayed on a monitor screen. The illustrated activity diagram 300 is produced from the model elements discussed above in FIGS. 15 to 19, particularly based on the model elements 81 to 84 of FIG. 19.

For example, an activity state 301 is displayed on the basis of one model element 81. Another activity state 302 is displayed on the basis of another model element 82. The model element 82 specifies "activity edge" in its relation type field and an element number of 171 in its linked element field. This activity edge is rendered as an edge 303 in the activity diagram 300, which starts at the former activity state 301 based on the model element 81 specified by the element number "171" and terminates at the latter activity state 302 based on the noted model element 82. The activity diagram 300 also includes an initial state 304, a final state 305, and their associated edges 306 and 307. The former edge 306 represents a state transition from the initial state 304 to the first activity state 301. The latter edge 307 represents a state transition from the second activity state 302 to the final state 305.

The third model element 83 in FIG. 19 has no particular corresponding symbol in the activity diagram 300 because of its equivalence to a preceding model element 82. The activity diagram 300 includes yet another activity state 311 produced on the basis of the fourth model element 84 in FIG. 19. This model element 84 specifies "sub-activity" in its relation type field and an element number of 181 in its linked element field, which is rendered in the activity diagram 300 as a sub-activity 310 associated with the linked model element 83. This sub-activity 310 is labeled _TEHAI_ according to the element content of the linked model element 83. The sub-activity 310 contains an initial state 312, a final state 313, and their respective edges 314 and 315. The former edge 314 represents a state transition from the initial state 312 to the activity state 311. The latter edge 315 represents a state transition from the activity state 311 to the final state 313. As a result of the above processing, the illustrated activity diagram 300 appears on a screen of the monitor 11, for example.

As can be seen from the above explanation, the second embodiment makes it possible to produce model elements for both a class diagram and an activity diagram, on the basis of system specifications described in a natural language. The produced model elements are then compiled into a class diagram and an activity diagram. For example, specifications of a system may be written by business practitioners who have a thorough knowledge of what the system is supposed to provide. The second embodiment enables automatic modeling of the system in the form of class diagrams and activity diagrams, without the need for help from system engineers.

(c) Other Embodiments and Variations

While the above sections have described how a class diagram and an activity diagram are produced, the second embodiment is not limited by those specific examples. The second embodiment may similarly be used to produce other desired diagrams by previously defining a set of translation rules for them. For example, it may be possible to produce other UML diagrams such as use case diagrams, interaction diagrams, state machine diagrams, and implementation diagrams.

The functions of the above-described embodiments may be implemented as a computer application. To achieve this implementation, the instructions describing those functions are encoded and provided in the form of computer programs. A computer system executes those programs to provide the processing functions discussed in the preceding sections. The programs may be encoded in a computer-readable, non-transitory medium for the purpose of storage and distribution. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network. For example, a computer stores necessary software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuits.

The above sections have exemplified several embodiments and their variations. The described components may be replaced with other components having equivalent functions or may include other components or processing operations. Where appropriate, two or more components and features provided in the embodiments may be combined in a different way.

(d) Conclusion

Various embodiments and variations have been described above by way of example. According to an aspect of those embodiments, the proposed techniques may facilitate the user to produce diagrams according to a specified modeling format.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable, non-transitory medium encoded with a program, the program causing a computer to perform a procedure comprising:
    storing a plurality of translation rules for different types of phrases, each translation rule describing how a phrase is to be translated into graphical symbol datasets and relationship link datasets, the graphical symbol datasets each specifying a graphical symbol with a content label representing content of the graphical symbol, the content label being or including a word contained in the phrase, the relationship link datasets each specifying a relationship link that represents a relationship between graphical symbols, the relationship link having a particular end shape to indicate a type of relationships;
    analyzing a statement written in a natural language to determine types and structure of phrases that constitute the statement; and
    translating each of the phrases constituting the statement into two or more graphical symbol datasets and one or more relationship link datasets, according to the translation rules pertinent to the determined types of the phrases.

2. The computer-readable, non-transitory medium according to claim 1, wherein the procedure further comprises displaying one or more diagrams based on the graphical symbol datasets and relationship link datasets produced by the translating, the diagram including two or more graphical symbols having respective content labels indicating content thereof, as well as one or more relationship links connecting the graphical symbols and each having a particular end shape to indicate the type of relationship between the connected graphical symbols.

3. The computer-readable, non-transitory medium according to claim 2, wherein the displaying displays two or more diagrams of different kinds by determining which kind of diagram is relevant to which relationship link dataset, according to the types of relationships represented by relationship links derived from the relationship datasets, and including the relationship links, together with graphical symbols connected by the relationship links, in the diagram that is determined to be relevant.

4. The computer-readable, non-transitory medium according to claim 3, wherein the displaying of two or more diagrams includes:
 including the relationship links, together with graphical symbols connected by the relationship links, in an activity diagram when the relationship links represent relationships between activities; and
 including the relationship links, together with graphical symbols connected by the relationship links, in a class diagram when the relationship links represent relationships between classes to be used.

5. The computer-readable, non-transitory medium according to claim 1, wherein the translating includes furnishing a newly produced graphical symbol dataset with pointer information that points at an existing graphical symbol dataset when the content label of the newly produced graphical symbol dataset coincides with that of the existing graphical symbol dataset.

6. The computer-readable, non-transitory medium according to claim 5, wherein:
 the procedure further comprises displaying one or more diagrams based on the graphical symbol datasets and relationship link datasets produced by the translating, the diagram including two or more graphical symbols having respective content labels indicating content thereof, as well as one or more relationship links connecting the graphical symbols and each having a particular end shape to indicate the type of relationship between the connected graphical symbols; and
 the displaying rejects from the diagrams a graphical symbol dataset that has been furnished with pointer information by the translating, while including a relationship link pertaining to the rejected graphical symbol dataset by attaching the relationship link to the graphical symbol derived from the graphical symbol dataset pointed at by the pointer information.

7. The computer-readable, non-transitory medium according to claim 1, wherein the translating includes finding a graphical symbol dataset whose content label represents a status, and furnishing the found graphical symbol dataset with state values that the status can take.

8. The computer-readable, non-transitory medium according to claim 7, wherein the procedure further comprises displaying one or more diagrams based on the graphical symbol datasets and relationship link datasets produced by the translating, the diagram including first graphical symbols each having a content label indicating content thereof and second graphical symbols each having both a content label indicating content thereof and state values given by the translating, the diagram further including one or more relationship links connecting two or more of the first and second graphical symbols and each having a particular end shape to indicate the type of relationship between the connected graphical symbols.

9. The computer-readable, non-transitory medium according to claim 7, wherein the furnishing furnishes the found graphical symbol dataset with two state values respectively representing a pending state and a completed state of an activity that is indicated by a word extracted from the phrase from which the found graphical symbol dataset has been produced.

10. An information processing apparatus comprising:
 a memory; and
 one or more processors configured to perform a procedure including:
 storing in the memory a plurality of translation rules for different types of phrases, each translation rule describing how a phrase is to be translated into graphical symbol datasets and relationship link datasets, the graphical symbol datasets each specifying a graphical symbol with a content label representing content of the graphical symbol, the content label being or including a word contained in the phrase, the relationship link datasets each specifying a relationship link that represents a relationship between graphical symbols, the relationship link having a particular end shape to indicate a type of relationships;
 analyzing a statement written in a natural language to determine types and structure of phrases that constitute the statement; and
 translating each of the phrases constituting the statement into two or more graphical symbol datasets and one or more relationship link datasets, according to the translation rules pertinent to the determined types of the phrases.

11. A method for generating diagrams, the method comprising:
 storing a plurality of translation rules for different types of phrases, each translation rule describing how a phrase is to be translated into graphical symbol datasets and relationship link datasets, the graphical symbol datasets each specifying a graphical symbol with a content label representing content of the graphical symbol, the content label being or including a word contained in the phrase, the relationship link datasets each specifying a relationship link that represents a relationship between graphical symbols, the relationship link having a particular end shape to indicate a type of relationships;
 analyzing, by a computer, a statement written in a natural language to determine types and structure of phrases that constitute the statement; and
 translating, by the computer, each of the phrases constituting the statement into two or more graphical symbol datasets and one or more relationship link datasets, according to the translation rules pertinent to the determined types of the phrases.

* * * * *